(12) United States Patent
Schwarz et al.

(10) Patent No.: US 10,712,858 B2
(45) Date of Patent: Jul. 14, 2020

(54) METHOD AND APPARATUS FOR CLASSIFYING CONTACTS WITH A TOUCH SENSITIVE DEVICE

(71) Applicant: QEEXO, CO., San Jose, CA (US)

(72) Inventors: Julia Schwarz, Pittsburgh, PA (US); Robert Bo Xiao, Saskatoon (CA); Chris Harrison, Pittsburgh, PA (US)

(73) Assignee: Qeexo, Co., Mountain View, CA (US)

( * ) Notice: Subject to any disclaimer, the term of this patent is extended or adjusted under 35 U.S.C. 154(b) by 0 days.

(21) Appl. No.: 14/684,407

(22) Filed: Apr. 12, 2015

(65) Prior Publication Data
US 2016/0299615 A1 Oct. 13, 2016

Related U.S. Application Data

(60) Provisional application No. 62/055,416, filed on Sep. 25, 2014.

(51) Int. Cl.
| | | |
|---|---|---|
| *G06F 3/041* | (2006.01) | |
| *G06F 3/043* | (2006.01) | |
| *G06F 3/01* | (2006.01) | |
| *G06K 9/46* | (2006.01) | |
| *G06K 9/62* | (2006.01) | |

(52) U.S. Cl.
CPC .............. *G06F 3/0416* (2013.01); *G06F 3/01* (2013.01); *G06F 3/0433* (2013.01); *G06K 9/46* (2013.01); *G06K 9/6201* (2013.01); *G06K 9/6267* (2013.01); *G06F 2200/1636* (2013.01); *G06F 2203/04104* (2013.01)

(58) Field of Classification Search
CPC ......... G06F 3/0416; G06F 2203/04104; G06F 3/041–047; G06K 9/6267; G06K 9/46
See application file for complete search history.

(56) References Cited

U.S. PATENT DOCUMENTS

| | | | |
|---|---|---|---|
| 6,323,846 B1 * | 11/2001 | Westerman | ........... G06F 3/0235 345/173 |
| 9,013,452 B2 | 4/2015 | Harrison et al. | |
| 9,019,244 B2 | 4/2015 | Harrison | |
| 9,329,688 B2 | 5/2016 | Harrison | |
| 9,329,715 B2 | 5/2016 | Schwarz et al. | |
| 9,612,689 B2 | 4/2017 | Harrison et al. | |

(Continued)

FOREIGN PATENT DOCUMENTS

| | | |
|---|---|---|
| JP | 2004-213312 A | 7/2004 |
| KR | 10-2002-0075283 A | 10/2002 |
| WO | 2006-070044 A1 | 7/2006 |

OTHER PUBLICATIONS

Non-Final Office Action—dated May 31, 2017—U.S. Appl. No. 14/612,089, filed Feb 2, 2015, titled: "Method and System for Activating Different Interactive Functions Using Different Types Of Finger Contacts."

(Continued)

*Primary Examiner* — Liliana Cerullo
(74) *Attorney, Agent, or Firm* — Kwan & Olynick LLP

(57) ABSTRACT

Touch sensitive devices, methods and computer readable recording mediums are provided that allow for improved classification of objects against a touch sensitive surface of a touch sensitive device based upon analysis of subdivisions of data representing contact with the touch sensitive surface during a period of time.

24 Claims, 16 Drawing Sheets

(56) References Cited

U.S. PATENT DOCUMENTS

| | | | |
|---|---|---|---|
| 2005/0083313 A1 | 4/2005 | Hardie-Bick et al. | |
| 2006/0152499 A1* | 7/2006 | Roberts | G06F 3/043 345/173 |
| 2008/0158147 A1* | 7/2008 | Westerman | G06F 3/0418 345/156 |
| 2009/0157206 A1* | 6/2009 | Weinberg | G06F 3/043 700/94 |
| 2011/0018825 A1 | 1/2011 | Kondo et al. | |
| 2011/0074544 A1* | 3/2011 | D'Souza | G06F 3/0416 340/5.83 |
| 2014/0240295 A1 | 8/2014 | Harrison | |
| 2014/0289659 A1 | 9/2014 | Harrison et al. | |
| 2014/0327626 A1 | 11/2014 | Harrison et al. | |
| 2015/0035759 A1 | 2/2015 | Harrison et al. | |
| 2015/0242009 A1 | 8/2015 | Xiao et al. | |
| 2016/0077615 A1 | 3/2016 | Schwarz et al. | |
| 2016/0077664 A1 | 3/2016 | Harrison et al. | |
| 2016/0085324 A1 | 3/2016 | Schwarz et al. | |
| 2016/0085333 A1 | 3/2016 | Harrison | |
| 2016/0085372 A1 | 3/2016 | Munemoto et al. | |
| 2016/0098185 A1 | 4/2016 | Xiao et al. | |
| 2016/0224145 A1 | 8/2016 | Harrison et al. | |
| 2017/0024892 A1 | 1/2017 | Harrison et al. | |
| 2017/0060279 A1 | 3/2017 | Harrison | |

OTHER PUBLICATIONS

Final Office Action—dated Dec. 20, 2016—U.S. Appl. No. 15/073,407, filed Mar. 17, 2016, titled: "Input Tools Having Viobro-Acoustically Distinct Regions and Computing Device for Use With the Same."

Non-Final Office Action—dated Nov. 10, 2016—U.S. Appl. No. 13/958,427, filed Aug. 2, 2013, titled: "Capture of Vibro-Acoustic Data Used to Determine Touch Types."

Final Office Action—dated Aug. 26, 2016—U.S. Appl. No. 14/219,919, filed Mar. 19, 2014, titled: "Method and Device for Sensing Touch Input."

Non-Final Office Action—dated Feb. 2, 2017—U.S. Appl. No. 14/191,329 filed Feb. 26, 2014, titled: "Using Capacitive Images for Touch Type Classification."

Final Office Action—dated Jun. 8, 2017—U.S. Appl. No. 13/887,711, filed May 6, 2013, titled: "Using Finger Touch Types to Interact With Electronic Devices."

Non-Final Office Action—dated Apr. 21, 2017—U.S. Appl. No. 15/075,648, filed Mar. 21, 2016, titled: "Method and Apparatus for Differentiating Touch Screen Users Based on Touch Event Analysis."

Non-Final Office Action—dated Dec. 1, 2016—U.S. Appl. No. 14/486,800, filed Sep. 15, 2014, titled: "Method and Apparatus for Resolving Touch Screen Ambiguities."

Final Office Action—dated Mar. 17, 2017—U.S. Appl. No. 14/492,604, filed Sep. 22, 2014, titled: "Method and Apparatus for Improving Accuracy of Touch Screen Event Analysis by Use of Edge Classification."

Non-Final Office Action—dated Nov. 25, 2016—U.S. Appl. No. 14/495,041, filed Sep. 24, 2014, titled: "Imethod for Improving Accuracy of Touch Screen Event Analysis by Use of Spatiotemporal Touch Patterns."

Non-Final Office Action—dated May 16, 2017—U.S. Appl. No. 14/503,894, filed Oct. 1, 2014, titled: "Method and Apparatus for Addressing Touch Discontinuities."

Final Office Action—dated Jan. 18, 2017—U.S. Appl. No. 14/684,407, filed Apr. 12, 2015, titled: "Method and Apparatus for Classifying Contacts With a Touch Sensitive Device."

Final Office Action—dated May 1, 2017—U.S. Appl. No. 14/834,434, filed Aug. 24, 2015, titled: "Touch Sensitive Devicewith Multi-Sensor Stream Synchronized Data."

Non-Final Office Action—dated Jun. 13, 2016—U.S. Appl. No. 14/751,589, filed Jun. 26, 2015, titled: "Method and Apparatus for Classifying a Touch Event on a Touch Screen As Related to One of Multiple Function Generating Interaction Layers and Activating a Function in the Selected Interaction Layer."

International Search Report and Written Opinion for PCT/US2016/044552; dated Oct. 17, 2016.

International Search Report and Written Opinion for PCT/US2016/040194; dated Sep. 19, 2016.

International Search Report and Written Opinion for PCT/US2015/051582; dated Feb. 26, 2016.

International Search Report and Written Opinion for PCT/U52015/051106; dated Jan 28, 2016.

International Search Report and Written Opinion for PCT/US2015/047616; dated Jul. 1, 2016.

European Patent Office Extended Search Report for EP 14 83 2247; dated Feb. 23, 2017.

European Patent Office Extended Search Report for EP 14 79 4212; dated Nov. 9, 2016.

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.

Benko, Hrvoje, Wilson, Andrew, Balakrishnan, Ravin; Sphere: Multi-Touch Interactions on a Spherical Display; Proceedings of UIST, 2008; pp. 77-86; 2008.

Surges, Christopher; A Tutorial on Support Vector Machines for Pattern Recognition; Data Mining and Knowledge Discovery, 2; pp. 121-167; 1998.

Gao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (Tabletop); pp. 139-146; 2008.

Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.

Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.

Dietz, Paul, Leigh, Darren; DiamondTouch: A Multi-User Touch Technology; ACM Symposium on User Interface Software & Technology (UIST); pp. 219-226; 2001.

Gutinin, Carl, Greenberg, Saul, Blum, Roger, Dyck, Jeff, Tee, Kimberly, McEWAN, Gregor; Supporting Informal Collaboration in Shared-Workspace Groupware; Journal of Universal Computer Science, 14(9); pp. 1411-1434; 2008.

Hall, Mark, Frank, Eibe, Holmes, Geoffrey, Pfahringer, Bernhard, Reutemann, Peter, Witten, Ian; The Iveka Data Mining Software: An Update; SIGKDD Explorations, 11(1); pp. 10-18; 2009.

Harrison, Chris, Tan, Desney, Morris, Dan; Skinput: Appropriating the Body as an Input Surface; Proceedings of CHI, 2010; pp. 453-462; 2010.

Harrison, Chris, Hudson, Scott; Scratch Input: Creating Large, Inexpensive, Unpowered and Mobile Finger Input Surfaces; Proceedings of UIST, 2008; pp. 205-208; 2008.

Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.

Hinckley, Ken, Song, Hyunyoung; Sensor Synaesthesia: Touch in Motion, and Motion in Touch; Proceedings of CHI, 2011; pp. 801-810; 2011.

Hinckley, Ken, Yatani, Koji, Pahud, Michel, Coddington, Nicole, Rodenhouse, Jenny, Wilson, Andy, Benko, Hrvoje, Buxton, Bill; Pen + Touch = New Tools; Proceedings of UIST, 2010; pp. 27-36; 2010.

Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.

Holz, Christian, Baudisch, Patrick; The Generalized Perceived Input Point Model and How to Double Touch Accuracy by Extracting Fingerprints; Proceedings of CHI, 2010; pp. 581-590; 2010.

(56) References Cited

OTHER PUBLICATIONS

Kaltenbrunner, Martin, Bencina, Ross; reacTIVision: A Computer-Vision Framework for Table-Based Tangible Interaction; Proceedings of TEI, 2007; pp. 69-74; 2007.
Matsushita, Nobuyuki, Rekimoto, Jun; HoloWall: Designing a Finger, Hand, Body, and Object Sensitive Wall; Proceedings of UIST, 1997; pp. 209-210; 1997.
Mimio; http://www.mimio.com.
Olwal, Alex, Wilson, Andrew; SurfaceFusion: Unobtrusive Tracking of Everyday Objects in Tangible User Interfaces; Proceedings of GI, 2008; pp. 235-242; 2008.
Paradiso, Joseph, Leo, Che King; Tracking and Characterizing Knocks Atop Large Interactive Displays; Sensor Review, 25(2); pp. 134-143; 2005.
Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; ToolStone: Effective use of the Physical Manipulation Vocabularies of Input Devices; Proceedings of UIST, 2000; pp. 109-117; 2000.
Rekimoto, Jun; SmartSkin: An Infrastructure for Freehand Manipulation on Interactive Surfaces; Proceedings of CHI, 2002; pp. 113-120; 2002.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Wang, Feng, Ren, Xiangshi; Empirical Evaluation for Finger Input Properties in Multi-Touch Interaction; Proceedings of CHI, 2009; pp. 1063-1072; 2009.
International Search Report and Written Opinion for PCT/US20121060865; dated Mar. 29, 2013.
Non-Final Office Action—dated Mar. 13, 2015—U.S. Appl. No. 13/958,427, filed Mar. 23, 2013, titled: "Capture of Vibro-Acoustic Data Used to Determine Touch Types".
Final Office Action—dated Jun. 19, 2015—U.S. Appl. No. 13/958,427, filed Mar. 23, 2013, titled: "Capture of Vibro-Acoustic Data Used to Determine Touch Types".
Non-Final Office Action—dated Apr. 6, 2015—U.S. Appl. No. 13/887,711, filed May 6, 2013, titled: "Using Finger Touch Types to Interact With Electronic Devices".
Final Office Action—dated Aug. 7, 2015—U.S. Appl. No. 14/191,329, filed Feb. 26, 2014, titled: "Using capacitive Images for Touch Type Classification".
Non-Final Office Action—dated Oct. 1, 2015—U.S. Appl. No. 14/492,604, filed Sep. 22, 2014, titled: "Method and Apparatus for Improving Accuracy of Touch Screen Event Analysis by Use of Edge Classification".
International Search Report and Written Opinion received for PCT Application No. PCT/US2014/049485 dated Nov. 17, 2014.
International Search Report and Written Opinion received for PCT Application No. PCT/US2014/033380 dated Mar. 13, 2015.
International Search Report and Written Opinion received for PCT Application No. PCT/US2014/034977 dated Sep. 18, 2014.
Non-Final Office Action—dated Dec. 18, 2015—U.S. Appl. No. 14/483,150, filed Sep. 11, 2014, titled: "Method and Apparatus for Differentiating Touch Screen Users Based on Touch Event Analysis".
Non-Final Office Action—dated Oct. 2, 2015—U.S. Appl. No. 14/486,800, filed Sep. 15, 2014, titled: "Method and apparatus for resolving touch screen ambiguities".
Non-Final Office Action—dated Dec. 30, 2015—U.S. Appl. No. 14/503,894, filed Oct. 1, 2014, titled: "Method and Apparatus for Addressing Touch Discontinuities".
Non-Final Office Action—dated Jan. 29, 2016—U.S. Appl. No. 14/219,919, filed Mar. 19, 2014, titled: "Method and Device for Sensing Touch Inputs".
Non-Final Office Action—dated Nov. 5, 2015—U.S. Appl. No. 13/887,711, filed May 6, 2013, titled: "Using Finger Touch Types to Interact With Electronic Devices".
Final Office Action—dated Feb. 24, 2016—U.S. Appl. No. 131887,711, filed May 6, 2013, titled: "Using Finger Touch Types to Interact With Electronic Devices".
International Search Report and Written Opinion for PCT/US2015/051355; dated Dec. 15, 2015.
International Search Report and Written Opinion for PCT/US2015/047428; dated Nov. 27, 2015.
International Search Report and Written Opinion for PCT/US2015/050570; dated Dec. 17, 2015.
International Search Report and Written Opinion for PCT/US2015/014581; dated May 14, 2015.
Non-Final Office Action—dated Oct. 7, 2015—U.S. Appl. No. 14/495,041, filed Sep. 24, 2014, titled: "Method for Improving Accuracy of Touch Screen Event Analysisby Use of Spatiotemporal Touch Patterns".

* cited by examiner

METHOD AND APPARATUS FOR CLASSIFYING CONTACTS WITH A TOUCH SENSITIVE DEVICE

CROSS-REFERENCE(S) TO RELATED APPLICATION(S)

This application claims the benefit of U.S. Provisional Patent Application No. 62/055,416, filed on Sep. 25, 2014. Further, cross-reference is made to the following commonly assigned and co-pending U.S. patent applications: U.S. patent application Ser. No. 14/612,089, entitled "Method and Apparatus for Classifying Finger Touch Events on a Touch Screen," filed on Feb. 2, 2015, U.S. patent application Ser. No. 13/958,427 entitled "Capture of Vibro-Acoustic Data used to Determine Touch Types, filed on Aug. 2, 2013, U.S. patent application Ser. No. 13/780,494, entitled "Input Tools Having Vibro-Acoustically Distinct Regions and Computing Device For Use With Same", filed on Feb. 28, 2013, U.S. patent application Ser. No. 13/849,698, entitled "Method and System For Activating Different Interactive Functions Using Different Types of Finger Contact", filed on Mar. 25, 2013, U.S. patent application Ser. No. 14/219,919, entitled "Method and Device for Sensing Touch Inputs", filed on Mar. 19, 2014, U.S. patent application Ser. No. 13/887,711 entitled "Using Finger Touch Types to Interact with Electronic Devices", filed on May 6, 2013 and U.S. patent application Ser. No. 14/191,329 entitled "Using Capacitive Images for Touch Type Classification", filed on Feb. 26, 2014, each of which is incorporated in its entirety herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch screen technology and more particularly to a method, apparatus and system for determining user inputs based upon touch sensing.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Various electronic devices today are typically operated by a user interacting with a touch screen. This feature is particularly a characteristic of the recent generation of smart phones. Typically, touch screen display screens respond to finger contact to activate the display for further processes. Contact may also be made using tools such as a stylus, other parts of the hand such as the palm and various parts of the finger. Smartphone manufacturers continuously develop new techniques to improve smartphone user experience.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

SUMMARY OF THE INVENTION

Touch sensitive devices, methods for operating touch sensitive devices and computer program products are provided. In one aspect, a method for classifying an object in contact with a touch sensitive surface is provided in which frame data is received, characteristics of the frame data are analyzed to determine descriptive features for a subdivision of the frame data that are indicative of the object and a frame contact classification for the object in contact with the touch sensitive surface is determined according to the descriptive features and the locations of the subdivisions. Other aspects and advantages of the present invention can be seen on review of the drawings, the detailed description and the claims, which follow.

DETAILED DESCRIPTION

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The figures in the following description relate to preferred embodiments by way of illustration only. The figures are not necessarily to scale. It should be noted that from the following discussion, alternative embodiments of the structures and methods disclosed herein will be readily recognized as viable alternatives that may be employed without departing from the principles of what is claimed.

Figure 1:
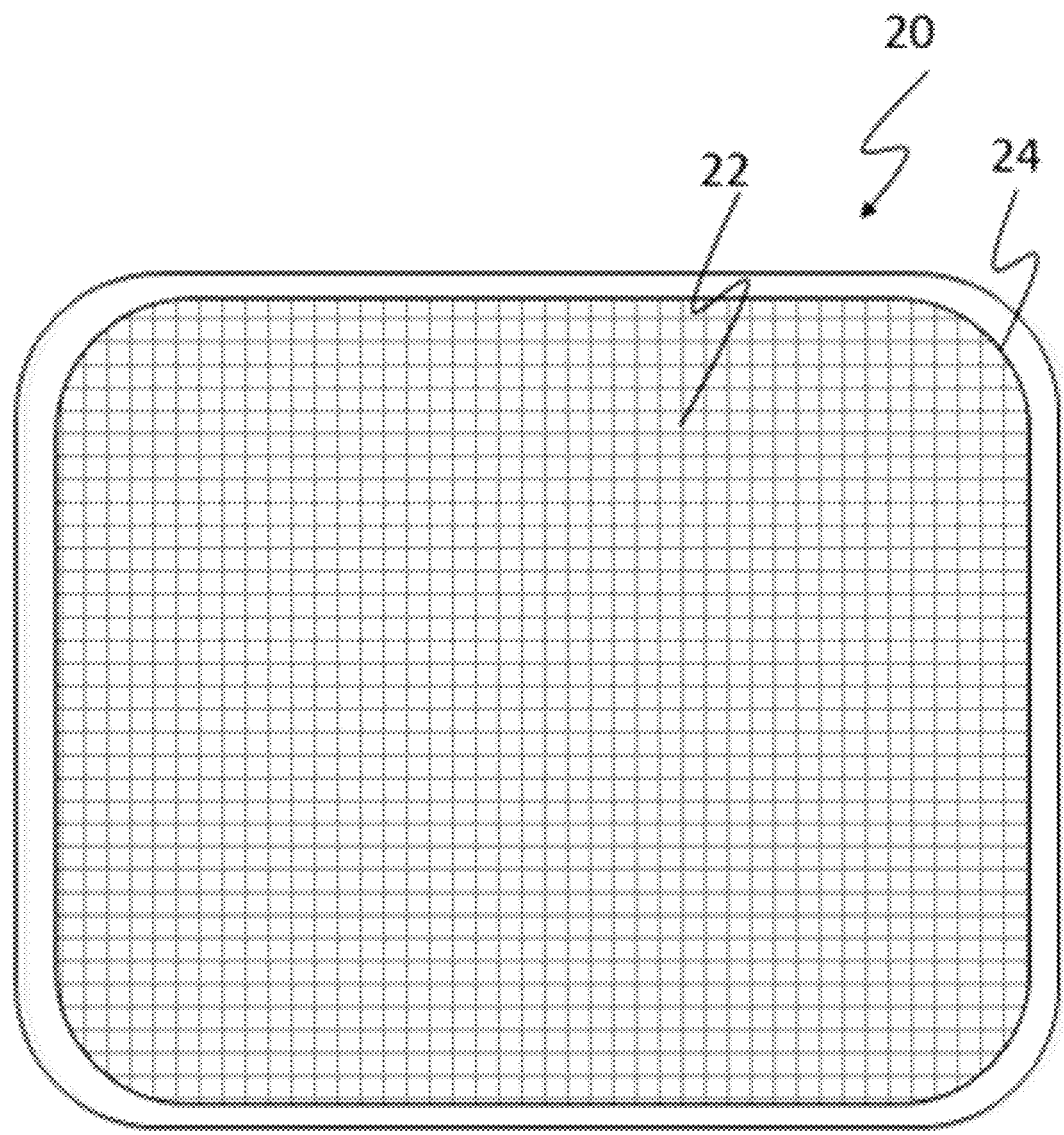
FIG. 1 shows a top view of a prior art touch sensitive device.

FIG. 1 illustrates an example of a touch sensitive device 20 such as a cellular telephone, personal computer, a display table, a personal digital assistant, a television or a touch sensitive graphic tablet typically has a touch sensitive surface 22 that is capable of sensing when an object has been brought into contact with touch sensitive surface 22. In a typical arrangement, touch sensitive surface 22 has an array of sensing elements 24 each associated with a predetermined portion of touch sensitive surface 22. When an object is brought into contact with touch sensitive surface 22, elements of the array of sensing elements 24 sense such contact and create signals from which a control device can determine which elements of the array were in contact with the object.

Touch sensitive device 20 sweeps the array of sensing elements 24 or otherwise polls each element in array 24 so that a control system (not shown) can determine which portions of touch sensitive surface 22 were in contact with another object in a given period of time such as $\frac{1}{30}^{th}$, $\frac{1}{60}^{th}$ or $\frac{1}{100}^{th}$ of a second. This information is often organized into frame data in the form of x,y dimensional data representing the contact state of each element in the array during the given period of time.

Figure 2:
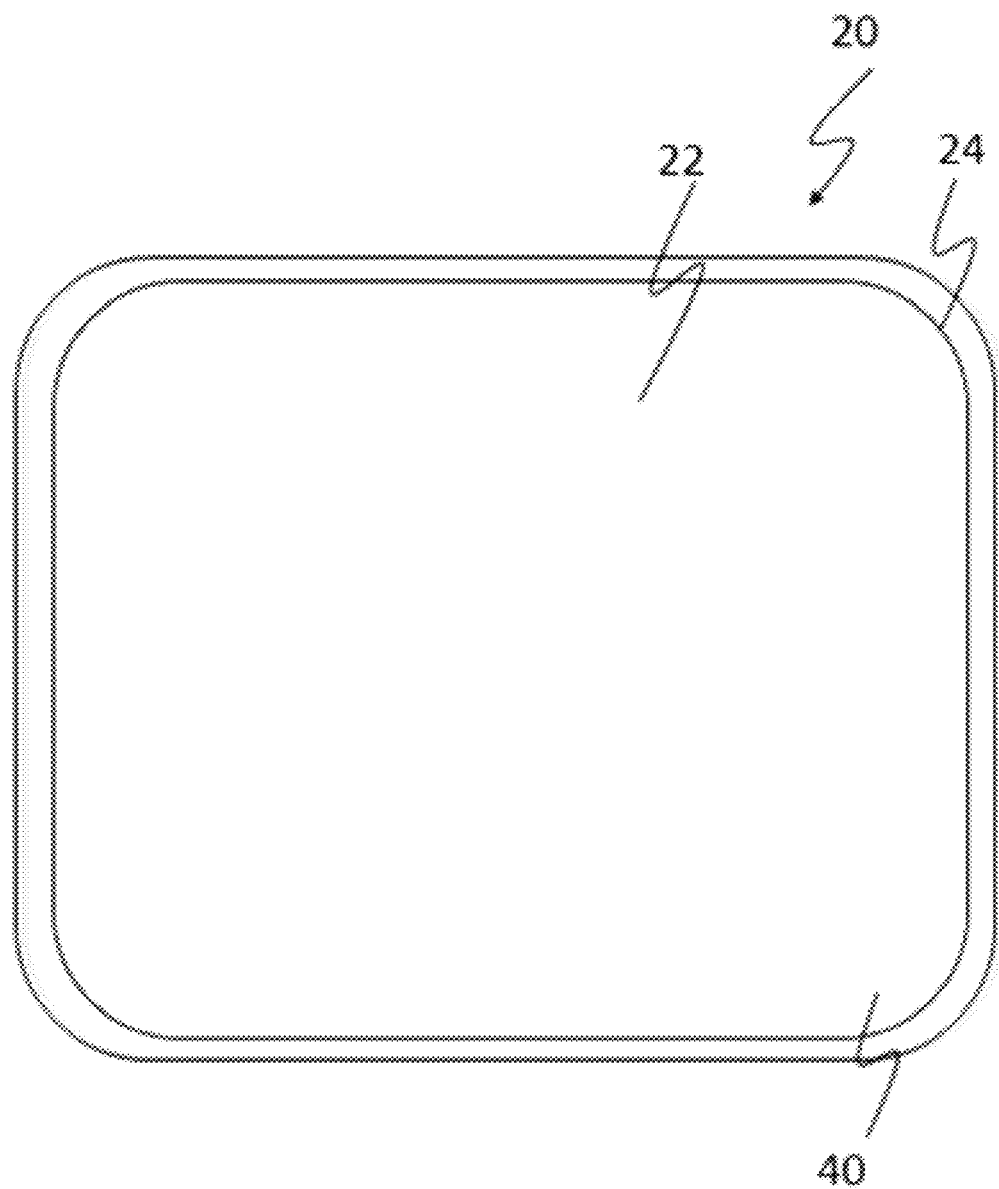
FIG. 2 shows top view of prior art touch sensitive device with frame data for a non-contact frame.

Frame data can be conceptually understood as providing an image or frame image having higher density portions representing areas of touch sensitive surface 22 that are in contact with another object. FIG. 2 illustrates a first example of such a frame image. In this example, no objects are in contact with the touch sensitive surface and therefore all sensing elements report that they are not in contact with another object. Where this occurs, a frame image 40 can have the appearance illustrated in FIG. 2 with no higher density portions.

Figure 3:
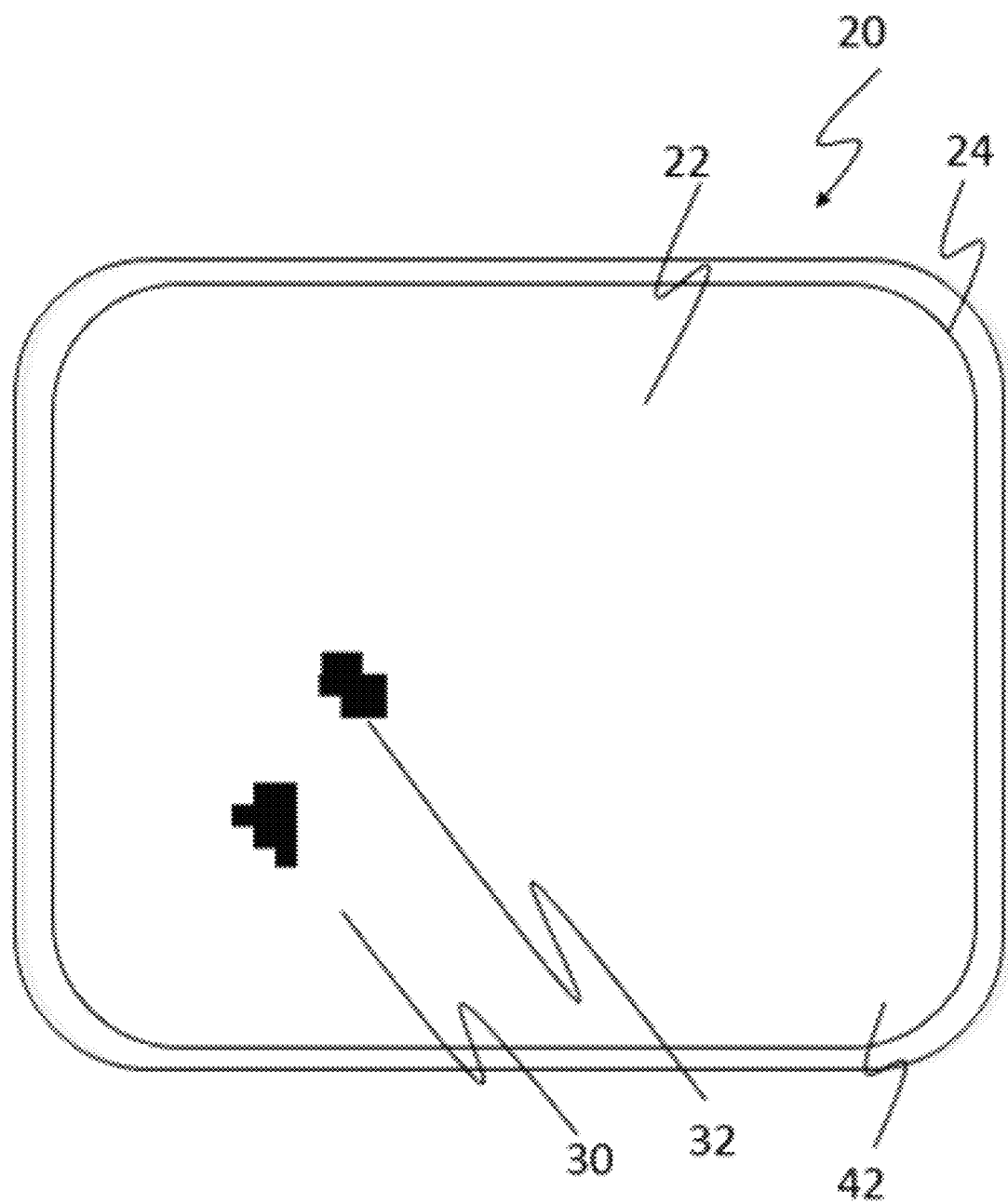
FIG. 3 shows a top view of prior art touch sensitive device with frame data for a two point contact frame.

However, when objects are brought into contact with touch sensitive surface 22 some of the sensing elements will report such contact and a contrast pattern emerges in a frame image representative of such a state. An example of this is illustrated in FIG. 3 which shows an example frame image 42 representing a frame sensed at a time during which two fingers are pressed against a touch sensitive surface 22. In this example, touch sensitive surface 22 has an array of sensing elements 24 that are read to indicate the binary states of contact or no contact. In the event that a contact is made with touch sensitive surface 22 such contact is either sufficient to cross a threshold for detection at each sensing element or it is not. In this example, a frame image such frame image 42 shown in FIG. 3 can be conceptually understood to include either an indication of contact or an indication of no contact and includes blobs 30 and 32 defined by a pattern of full density areas where sensing elements of array of sensing elements 24 sense contact with another object.

Figure 4:
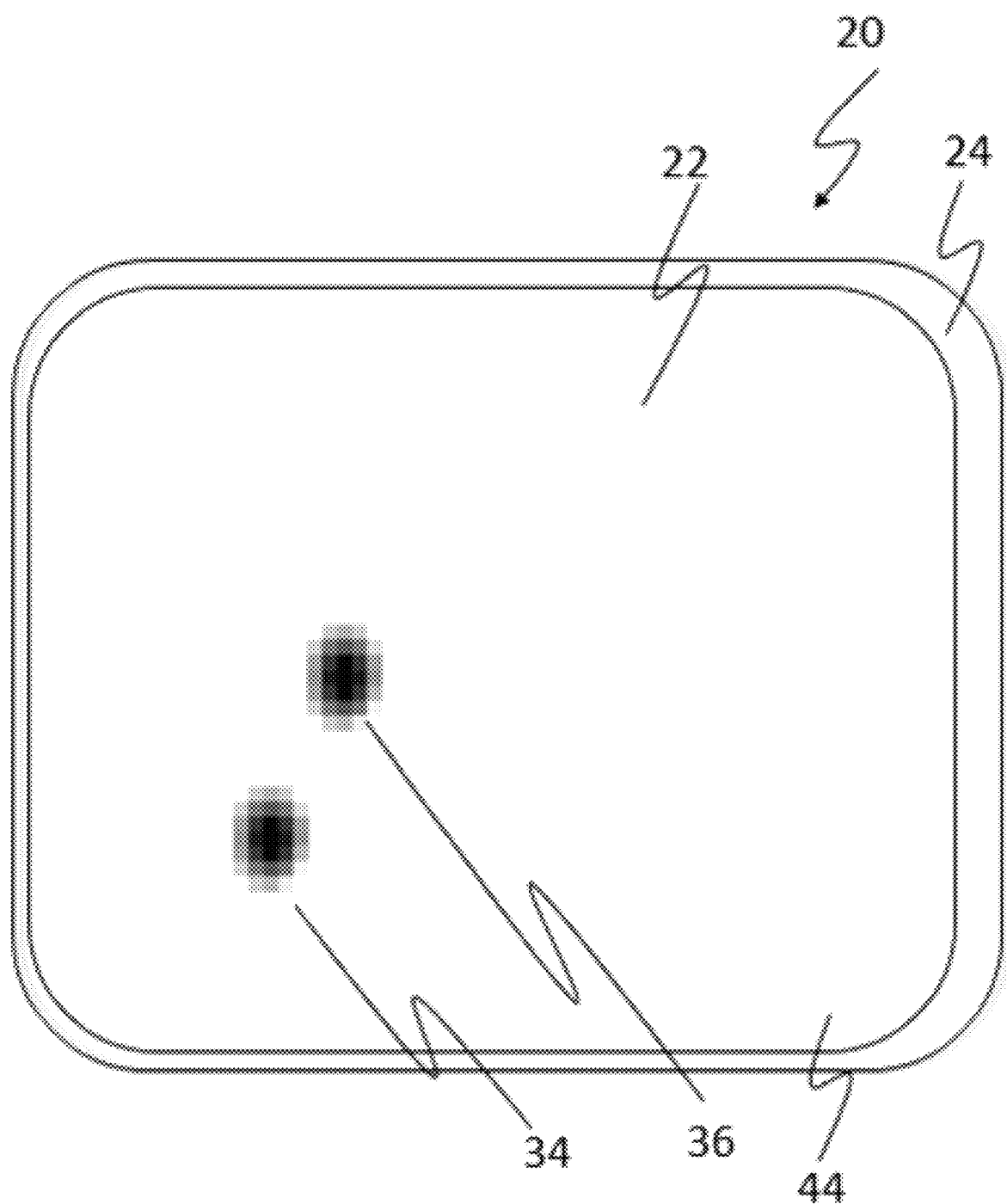
FIG. 4 shows a top view of prior art touch sensitive device with frame data for a two point contact frame with intensity data.

In many modern touchscreen systems, array of sensing elements 24 is capable of determining some level of intensity of contact information, such as an amount of pressure applied, an intensity of the resistance experienced at the point contact, the intensity of a capacitance or other intensities related to contact at each element in the array of sensing elements 24. Where such sensing technologies are used, a frame image such as frame image 44 shown in FIG. 4 may be representative of contact intensity data sensed by array of sensing elements 24. It will be appreciated that, in this embodiment, intensity of contact information can be conceptually understood to be reflected in the frame image as grayscale image data. The example shown in FIG. 4 depicts a frame image 44 made using such a system in response to the same finger contacts with touch sensitive surface 22 that are depicted in FIG. 3, however as is shown in FIG. 4, frame image 44 incorporates grayscale information that indicates an intensity of some aspect of the contacts within blobs 34 and 36.

Figure 5:
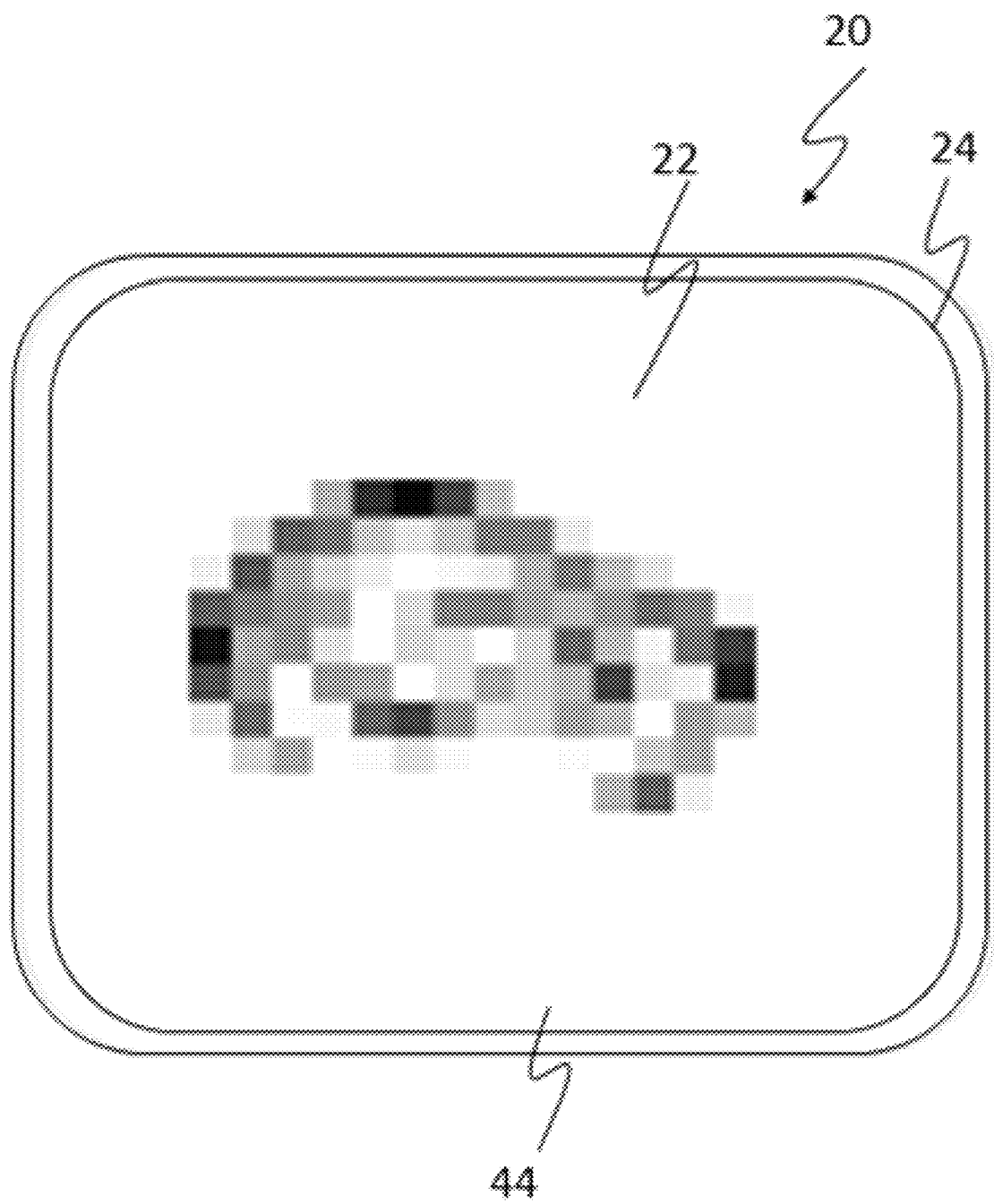
FIG. 5 shows a top view of prior art touch sensitive device with frame data for an ear contact.

It will be understood that in application, the set of objects contacting touch sensitive surface 22 is not limited to fingers. For example, cellular phones, personal digital assistants, and tablet devices may well be held against an ear or face of a user at times so as to enable the user to better hear the sound produced by the device or to hear the sound produced by the device more confidentially. This can create a plurality of contacts with touch sensitive surface 22. FIG. 5 illustrates a frame image 46 that is exemplary of a frame image that can be captured when a touch sensitive surface 22 has an array of sensing elements 24 that are intensity sensitive and that are in contact with an ear. As can be seen from this, it may be challenging for a touch sensitive device 20 to determine whether this represents a pattern of one or more finger contacts with touch sensitive surface 22 or whether this pattern of contacts represents contact with an ear or other physical feature of the user.

The accuracy and efficiency with which touch sensitive device 20 can discriminate between such different types of contact can have significant consequences on the use, activation, usability, and functionality of the device.

The ability to accurately make this discrimination is therefore one of the more challenging aspects of the design of modern touch sensitive devices. What is needed in the art therefore is a new, novel and nonobvious method property of a touch sensitive device such that touch sensitive device 20 will accurately discriminate between frame data representing contact information caused by multipoint finger contact and frame data that has contact information associated with other types of multipoint head contact.

It will be appreciated, that in some cases, discrimination can be based upon the pattern of touch contacts against touch sensitive surface 22. That is, the frame image can be analyzed using pattern recognition tools to determine whether the two-dimensional image provided by touch sensitive surface 22 has an appearance associated with a particular type of contact. For example, palm touch contacts appear as large irregular blobs while fingers tend to appear as smaller ellipsoids. This difference in shape and size can be used to tell them apart (i.e., through various classification techniques, such as machine learning).

Alternatively, supplemental information can also be used to facilitate such discrimination. For example, visible light sensors and infrared sensors have been included in digital display devices have been used to detect when a user positions its head when the head of a user is positioned in close proximity to the touch screen surface. This can discriminate between a finger contact and a head contact. Similarly, by vibro-acoustic data can be monitored to provide information that can help to disambiguate between types of contact with a touch sensitive device. For example, vibro-acoustic data can be sensed and used to help to identify when the touch sensitive surface has been brought into contact with fingertips, finger knuckles, fingernails, a stylus or a wide variety of other types of things.

However, while such supplemental systems can be commercially and practically highly useful and valuable, it is also useful to consider other approaches that might allow robust discrimination between types of multipoint contacts with a touch sensitive surface without the necessary use of such supplemental systems. Thus, more generally, what is needed in the art therefore is a new, novel and nonobvious method or property of a touch sensitive device 20 such that a touch sensitive device 20 will accurately discriminate different types of multi-point contacts against a touch sensitive surface with reduced reliance on other sensing system.

Figure 6:
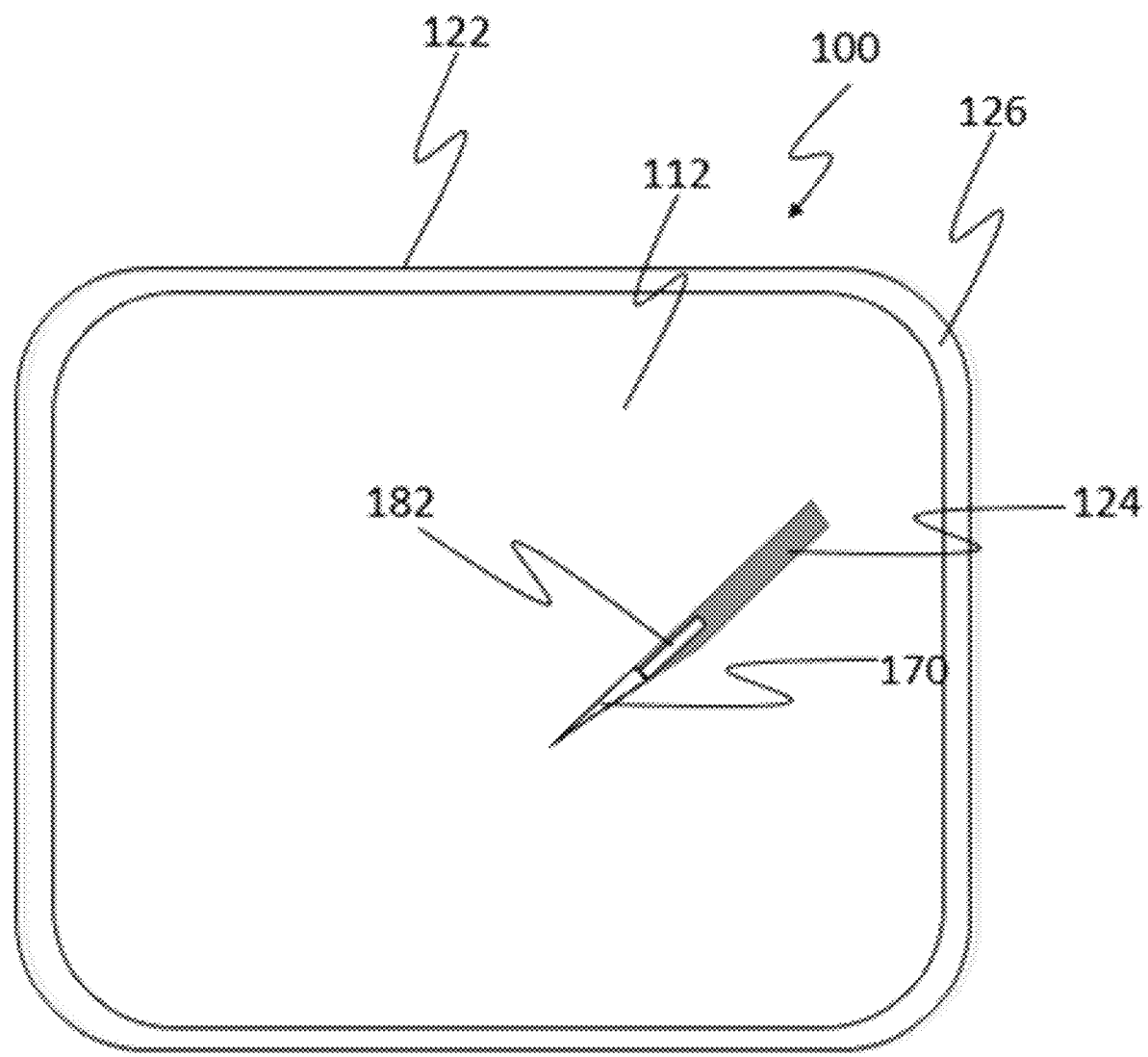
FIG. 6 shows a top view of a touch sensitive device and an object in contact with it.
Figure 7:
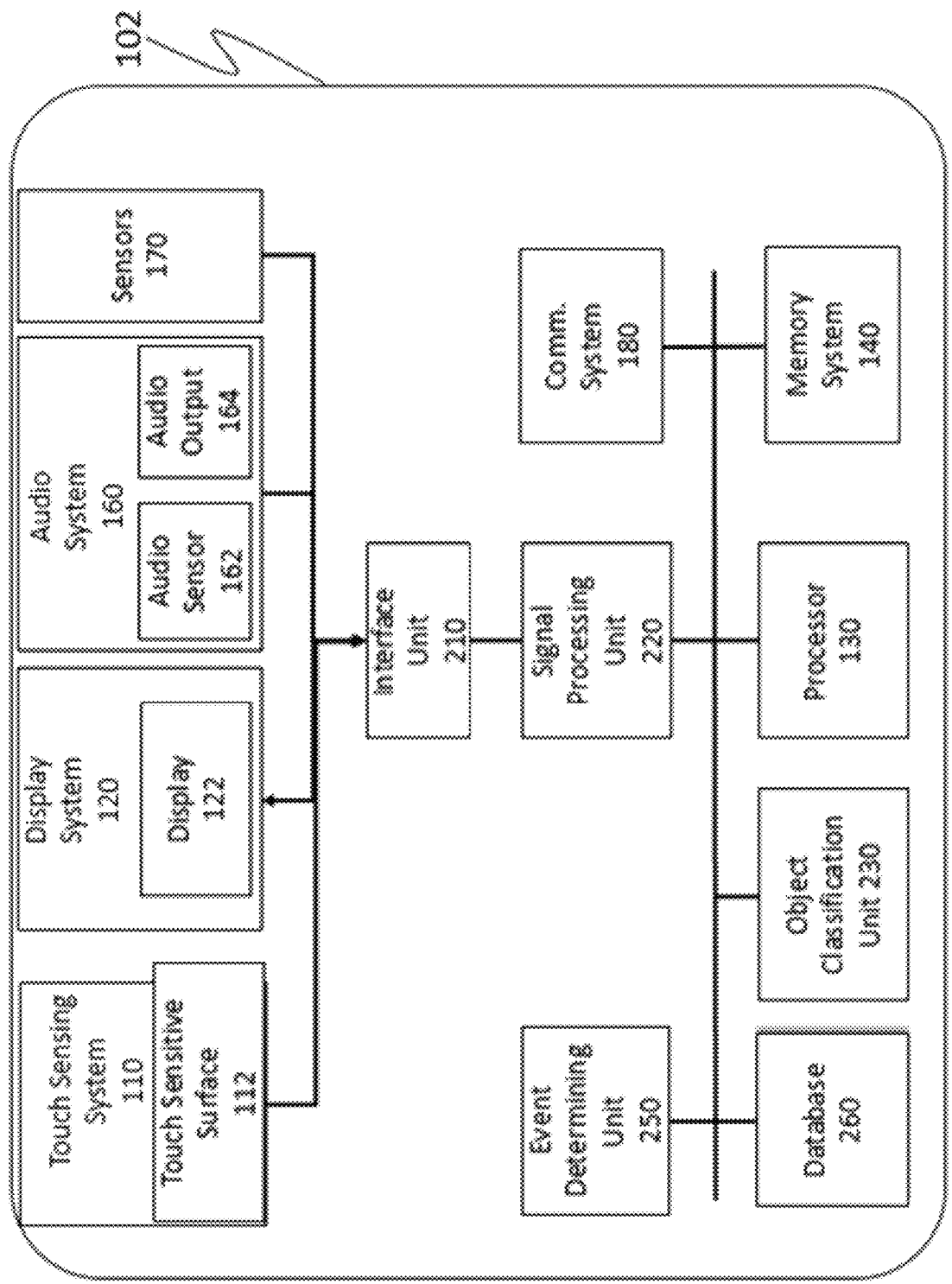
FIG. 7 is a block diagram of one embodiment of a touch sensitive device.

FIG. 6 shows an exterior view of a touch sensitive device 100 and FIG. 7 shows a block diagram of a touch sensitive device 100 according to one embodiment of the present invention. In this embodiment, touch sensitive device 100 has a display system 120 having a display 122 that presents an image over a two-dimensional presentation area 126. In this embodiment, a touch sensing system 110 provides a touch sensitive surface 112 that is at least in part coextensive with presentation area 126. Touch sensitive surface 112 is adapted to detect when an object 124 such as a fingertip or the illustrated stylus is positioned in contact with touch sensitive surface 112 and to generate a signal from which it can be determined which portion of touch sensitive surface 112 is in contact with object 124.

Touch sensitive device 100 of FIGS. 6 and 7 can take any of a variety of forms including as shown in FIG. 6, a smartphone. However, in other embodiments, touch sensitive device 100 can take other forms including but not limited to any type of digital equipment having a touch sensing system 110 and a processor 130 such as a microprocessor, micro-controller, or any other type of programmable control device, or a preprogrammed or dedicated processing or control system. Examples of such touch sensitive devices 100 include desktop computers, notebook computers, workstations, PDAs, web pads, and mobile phones (other than smartphones). Similarly, touch sensitive device 100 can take other forms such as the forms of standalone touch pads and track pads as well as systems that incorporate touch sensitive surfaces and 22 such as touch pads, graphics tablets and track pads. In this regard, it will be appreciated that while the components of touch sensitive device 100 are illustrated as being within a single housing 102, this is optional, and these components may be located in separately housed components of touch sensitive device 100.

In the embodiment that is illustrated in FIGS. 6 and 7, touch sensitive device 100 has a touch sensing system 110 incorporating a touch sensitive surface 112 that senses when an object 124 touches touch sensitive surface 112. An array of sensing elements 22 such as array of sensing elements 24 can for example be used. Touch sensing system 110 generates signals from which it can be determined what portion of touch sensitive surface 112 is in contact with object 124. A processor 130 receives the signals from touch sensing system 110 and analyzes the signals to detect strokes or other contact made by an object 124 against touch sensitive surface 112.

In the embodiment illustrated in FIGS. 6 and 7, touch sensitive device 100 further has a memory system 140. Memory system 140 may be capable of providing programming and other forms of instructions to processor 130 and that can be used for other purposes. Memory system 140 may include read only memory, random access semiconductor memory or other types of memory or computer readable media that may be permanently installed or separably mounted to touch sensitive device 100. Additionally, touch sensitive device 100 may also access a memory system 140 that is separate from touch sensitive device 100 by way of an optional communication system 180.

Touch sensitive device 100 is also shown having other optional components such an audio system 160 having an audio sensor 162 such as a microphone and or connection to a microphone and an audio output 164 such as a speaker or connection to a speaker. Touch sensitive device 100 may also include, as illustrated, a display system 120 with display 122, sensors 170, an interface unit 210, a signal processing unit 220, an object classification unit 230, and an event determining unit 250 and a database 260.

Sensors 170 can take any of a variety of forms and can comprise generally any known device for sensing conditions inside or outside of sensing device 100. Sensors 170 can, without limitation, take the form of acoustic sensors, accelerometers, light sensors, range finders, thermometers, Hall effect sensors, switches such as 2-way, 4-way switch, a 6-way switch, an 8-way switch, mouse and trackball systems, a joystick system, a voice recognition system, a video based gesture recognition system or other such systems, radio frequency identification and near field communication sensors, bar code sensors, position sensors and other sensors known in the art that can be used to detect conditions that may be useful to in governing operation or performing functions of image sensor convert this information into a form that can be used by processor 130 in governing operation of touch sensitive device 100. Sensors 170 can also include biometric sensors adapted to detect characteristics of a user for security and affective imaging purposes.

Alternatively or additionally, sensors 170 can include accelerometers, vibration sensors, ultrasonic sensors, piezoelectric devices or other known circuits and systems that can sense vibrations or sounds that are indicative of contact between an object 124 and touch sensitive surface 112.

Sensors 170 can also include pressure sensors that can sense an amount of pressure applied by object 124 against touch sensitive surface 112. In some embodiments of this type touch sensitive surface 112 can be of a type that can sense not only which portion of touch sensitive surface 112 has been contacted by object 124 but the amount of pressure applied against touch sensitive surface. Various technologies of this type are known examples of which include, but are not limited to graphics tablets sold under the Wacom brand by Wacom Co., Ltd., Kazo, Saitama, Japan and that are presently capable of sensing 1024 different levels of pressure.

In still other embodiments, sensors 170 can include one or more sensors 170 that can optionally be incorporated in or on object 124 and that can sense conditions indicative of an amount of force applied between object 124 and touch sensitive surface 112. In such embodiments, a force sensor 170 can take the form of, for example and without limitation, a piezoelectric sensor, a stress sensor, a strain sensor, a compression sensor, a deflection sensor, or resiliently biased sensing system that can sense force based on an extent of deflection movement of a contact surface against the force of the resilient member and that can generate a signal that is indicative of the amount of force applied by or through an indicator against touch sensitive surface 112.

Such a force sensor 170 can be directly connected to interface unit 210 by way of a wired connection or a wireless connection such as by an optional wireless communication module 182 that is capable of communication with communication system 180.

In further embodiments, force sensing can be achieved by providing an object 124 such as a stylus as illustrated in FIG. 6, that may in some embodiments have a rounded flexible tip such as a rubber or metallic mesh tip that are arranged in a resilient manner to flatten when pressed against touch sensitive surface 112 increasing the amount of surface area in contact with touch sensitive surface 112. In such embodiments, the size of the area in contact with touch sensitive surface 112 is an effective proxy for the amount of force applied by a user against touch sensitive surface 112 and in this regard a touch sensitive surface that is capable of sensing area that is in contact with touch sensitive surface 112 can be used for this purpose. Similar results can be achieved, with proper calibration, using a fingertip or other such object 124.

Communication system 180 can take the form of any optical, radio frequency or other circuit or system that can convert data into a form that can be conveyed to an external device by way of an optical signal, radio frequency signal or other form of wired or wireless signal. Communication system 180 may be used for a variety of purposes including but not limited to sending and receiving instruction sets and exchanging data with remote sensors or memory systems.

As shown in FIG. 7, touch sensitive device 100 according to one embodiment of the invention may comprise an interface unit 210. Interface unit 210 may receive signals for example from touch sensing system 110, audio system 160, and/or sensors 170 or any components thereof and process these signals for use by processor 130 or by a signal processing unit 220 taking the form of a signal processor or signal processing circuit.

Interface unit 210 can for example be connected to outputs from touch sensing system 110, audio system 160, and sensors 170. Such outputs are often in analog form and interface unit 210 can include analog to digital converters of any known type that can convert such outputs into digital signals that can be used by signal processing unit 220 or processor 130. Interface unit 210 may also include amplifiers, filters, including but not limited to noise filters, band pass/band reject filters or couplings, breakers, fusible links or other systems that protect other components of touch sensitive system 100 from potential damage.

Interface unit 210 according to one embodiment of the invention may perform a function of interfacing with audio sensor 162 and sensors 170 to sense a sound or vibration generated when object 124 contacts touch sensitive surface 112, or, in other embodiments, other specific parts (i.e., the exterior parts) of touch input sensing device 100.

One approach can utilize both sources of vibro-acoustic signal with one or more sensors (e.g., one for in-air acoustics, and one for mechanical vibrations, also referred to as structural acoustics). Several types of audio sensors 162 or other sensors 170 can be used including but not limited to:
Piezoelectric bender elements;
Piezoelectric film;
Accelerometers (e.g., linear variable differential transformer (LVDT), Potentiometric,
Variable Reluctance, Piezoelectric, Piezoresistive, Capacitive, Servo (Force Balance), MEMS);
Displacement sensors;
Velocity sensors;
Vibration sensors;
Gyroscopes;
Proximity Sensors;
Electric microphones;
Hydrophones;
Condenser microphones;
Electret condenser microphones;
Dynamic microphones;
Ribbon microphones;
Carbon microphones;
Piezoelectric microphones;
Fiber optic microphones;
Laser microphones;
Liquid microphones; and,
MEMS microphones Importantly, many touchscreen computing devices today already have microphones and accelerometers built in (e.g., for voice and input sensing). These can be utilized without the need for additional sensors, or can work in concert with specialized sensors.

To this end, interface unit 210 may receive signals from audio sensor 162 or a sensor 170 that can sense vibrations and may prepare the signals for use by signal processor 220. In this embodiment, this takes the form of converting such signals into digital form and providing a digital signal representative of conditions sensed by audio sensor 162 and sensor 170.

Interface unit 210 may also receive signals from processor 130 and/or signal processing unit 220 and may use these signals to control operation of display system 120, audio system 140 and communication system 180. In this regard, interface unit 210 may include display drivers, audio output systems including amplifiers and the like. It will be appreciated that some or all of the functions ascribed to interface unit 210 may be performed by hardware or programs that are integrated within touch audio system 160, sensors 170 or communication system 180.

Signal processing unit 220 receives signals from interface unit 210 that may be in digital form and prepares the signals for further processing. Signal processing unit 220 may perform at least one of sampling, quantization and encoding processes and optionally may also be used in converting analog signals into a digital signal. Signal processing unit 220 may transmit the digital signals to processor 130 or object classification unit 230.

In this embodiment an event determining unit 250 is provided that at least in part determines that an event has occurred based upon the classification of the object and this determination is used to control operation of touch sensitive device 100. A database 260 is also provided in which program software and other data may be stored.

According to one embodiment of the invention, at least some of functions of interface unit 210, signal processing unit 220, object classification unit 230, event determining unit 250, and database 260, may be program modules to control or communicate with other commonly known hardware components or components for executing software, which are included for example in touch sensitive device 100 including for example and without limitation processor 130, memory system 140, interface unit 210 and in some embodiments signal processing unit 220. The program modules may be included in touch sensitive device 100 in the form of operating systems, application program modules or other program modules, while they may be physically stored in a variety of commonly known storage devices. Further the program modules may be stored in a remote storage device that may communicate with touch sensitive device 100 by way of communication system 180. Meanwhile, such program modules may include, but are not limited to, routines subroutines, programs, objects, components, data structures and the like for performing specific tasks or executing specific abstract data types as described below in accordance with the present invention. Such program modules may also be expressed in terms of configurations of hardware adapted to perform the functions associated with such modules.

Object classification unit 230 analyzes the digital signals transmitted from signal processing unit 220 to classify the type of object 124 brought into contact with touch sensitive surface 112.

In general when object classification unit 230 characterizes such an object, classification unit 230 receives a signal having frame information in the form of x,y coordinate values each representing which portions of touch sensitive surface 24 are in contact with object 124. As is known in the art, obtaining such x,y coordinate values using a typical touch sensitive surface 112 involves sampling the touch sensitive surface 112 at a predetermined rate such as for example a hundred times per second. In one such embodiment, the positions of touch sensitive surface 112, if any, that are in contact with object 124 are sensed one hundred times per second and frame data is generated representing an x-coordinate value and a y-coordinate map indicative of the positions of contact between object 124 and touch sensitive surface 112 and in some embodiments an intensity value is assigned for the x-y coordinate value.

Object 124 can comprise any object that can contact touch sensitive surface 112 and that can be detected thereby. Although listed in singular form as "object" 124, it will be appreciated that for the purposes of this disclosure and "object" can comprise any combination of items that can be brought into contact with a touch sensitive surface 122 during a frame, including but not limited to fingers, combinations of different parts of fingers, indicators including styluses or pens, different parts of a body such as a head, cheek bone, mouth, face, beard or hair, hats, headgear, and head wrappings or combinations thereof.

In other embodiments, object 124 can take the form of an electronic pen, stylus or other tool with or without electric circuits therein, which may or may not belong to the touch input sensing device 100 except when object 124 is a body part of the user such as the user's finger. Object 124 may be made of various materials such as metal, wood, plastic, rubber, and glass and may comprise body parts such as fingers, hands, arms, head and neck. When object 124 is the user's finger, each of the specific parts of the finger may become object 124 according to the present invention because fingers are usually constituted by various parts such as tips, nails, knuckles, and joints.

An object classification unit 230 is provided. Object classification unit 230 uses the x,y coordinate data representing portions of touch sensitive surface 200 in contact with another object and optionally any intensity data from the frame data and classifies the nature of the contact(s) sensed by touch sensitive surface 112.

Figure 8:
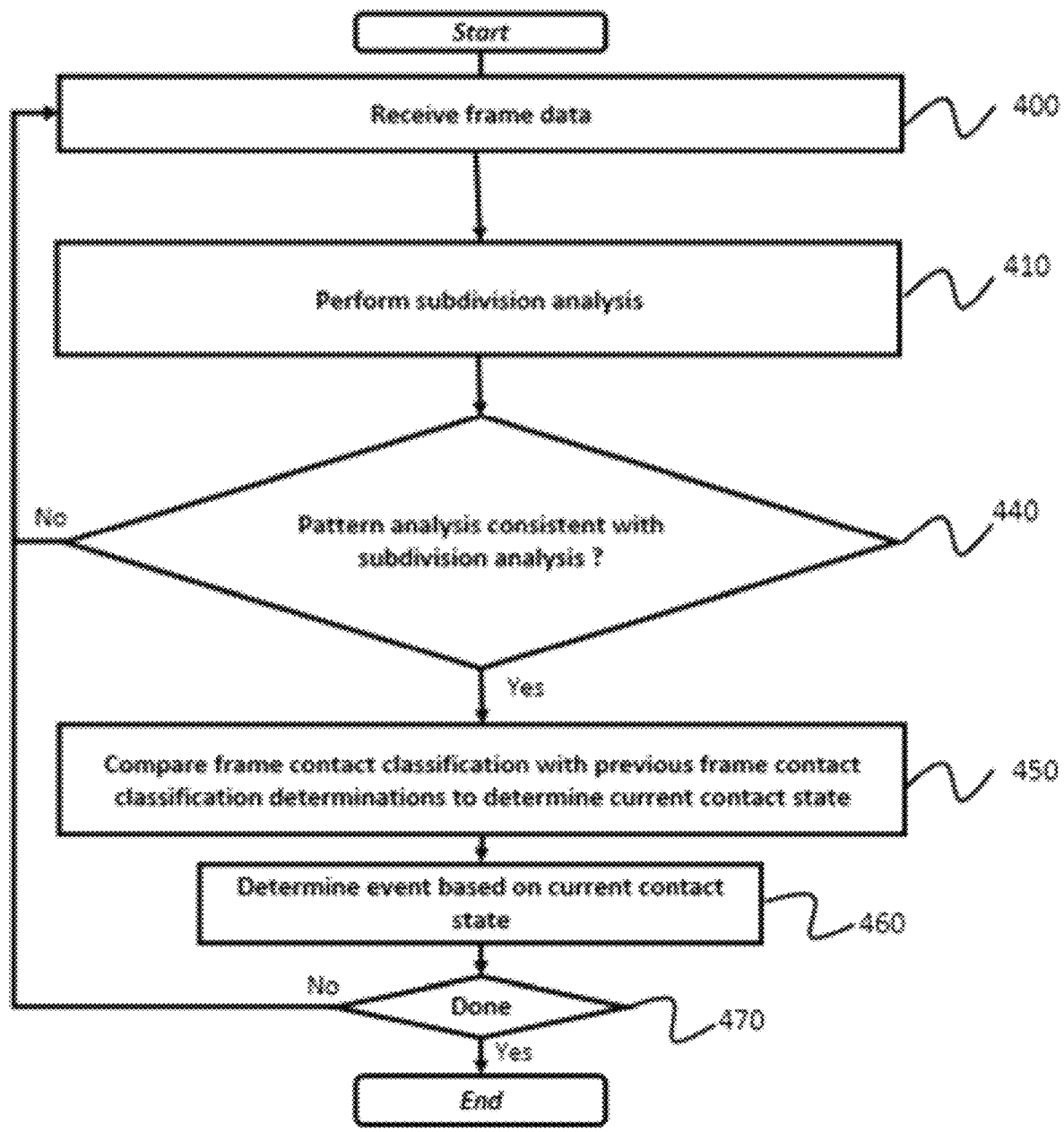
FIG. 8 illustrates a method of the invention.
Figure 9:
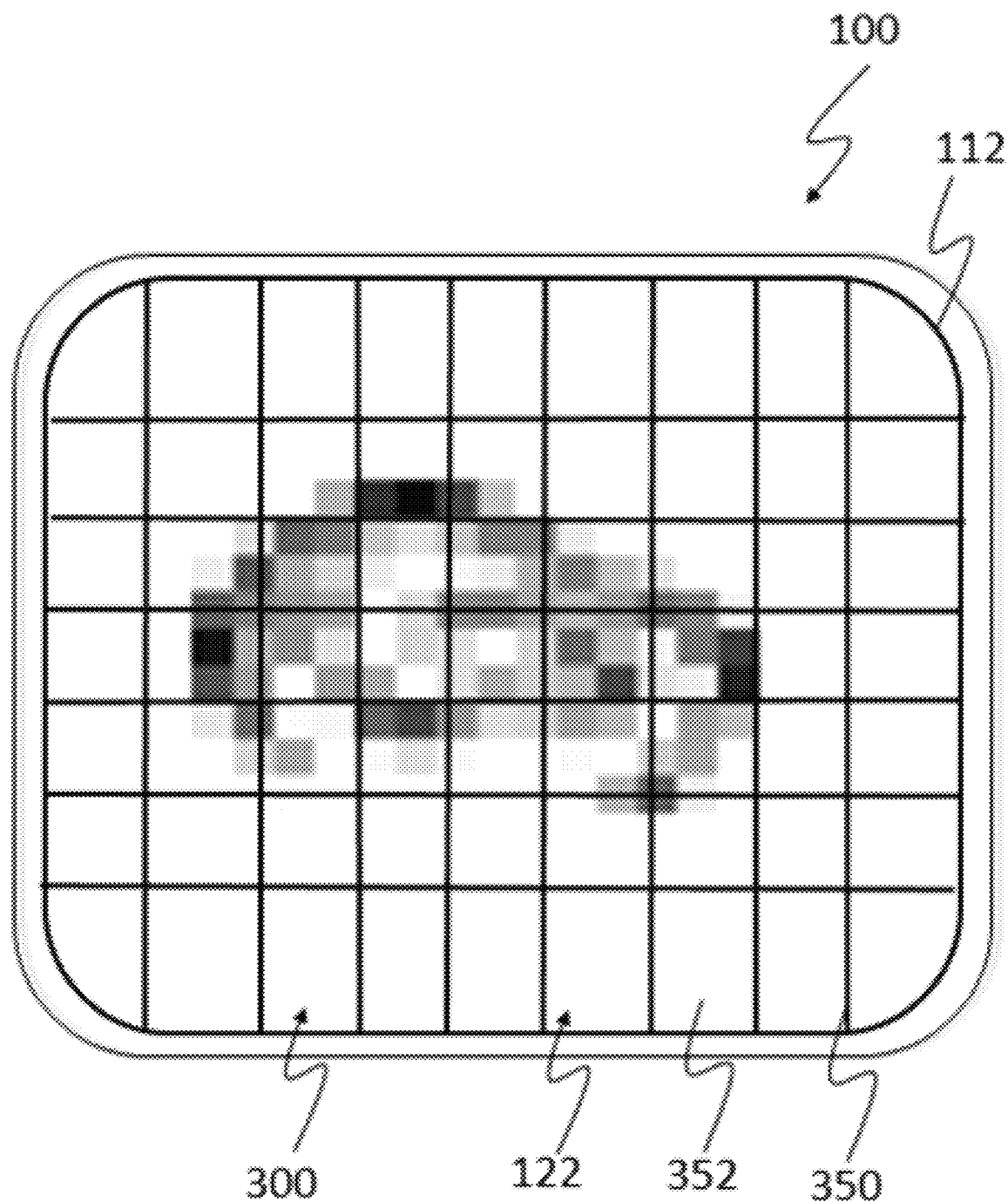
FIG. 9 illustrates an example of one arrangement of bounding areas.

The operation of object classification unit 230 is illustrated with reference to FIGS. 8-11. FIG. 8 illustrates a first embodiment of a method for classifying contacts against touch sensitive surface 112. As is shown the embodiment of FIG. 8, frame data is received (step 400). FIG. 9 illustrates an example of an image 300 representing the frame data. In this example, the frame data depicted in image 300 was sensed, for example and without limitation, when an object such as an ear is in contact with touch sensitive surface 110.

In touch sensitive device 100, object classification unit 230 receives frame data representing x,y coordinates of each portion of touch sensitive surface 100 that is in contact with another surface and performs a method for classifying a type of contact that is then supplied to event determining unit 250.

In this embodiment, classification includes a subdivision analysis (step 410). In the subdivision analysis, the frame data is divided into subdivisions and each subdivision is analyzed for characteristics that may or may not indicate consistency with the determined classification. There are various forms for such subdivisions. These subdivisions are demarcated for the purposes of the following discussion in terms of bounding areas and a variety of bounding area shapes are possible. Bounding area shapes can be mutually exclusive that is defined so that no portion of a bounding area overlaps a portion of another or they can be defined so that the bounding areas can at least in part overlap.

Figure 10:
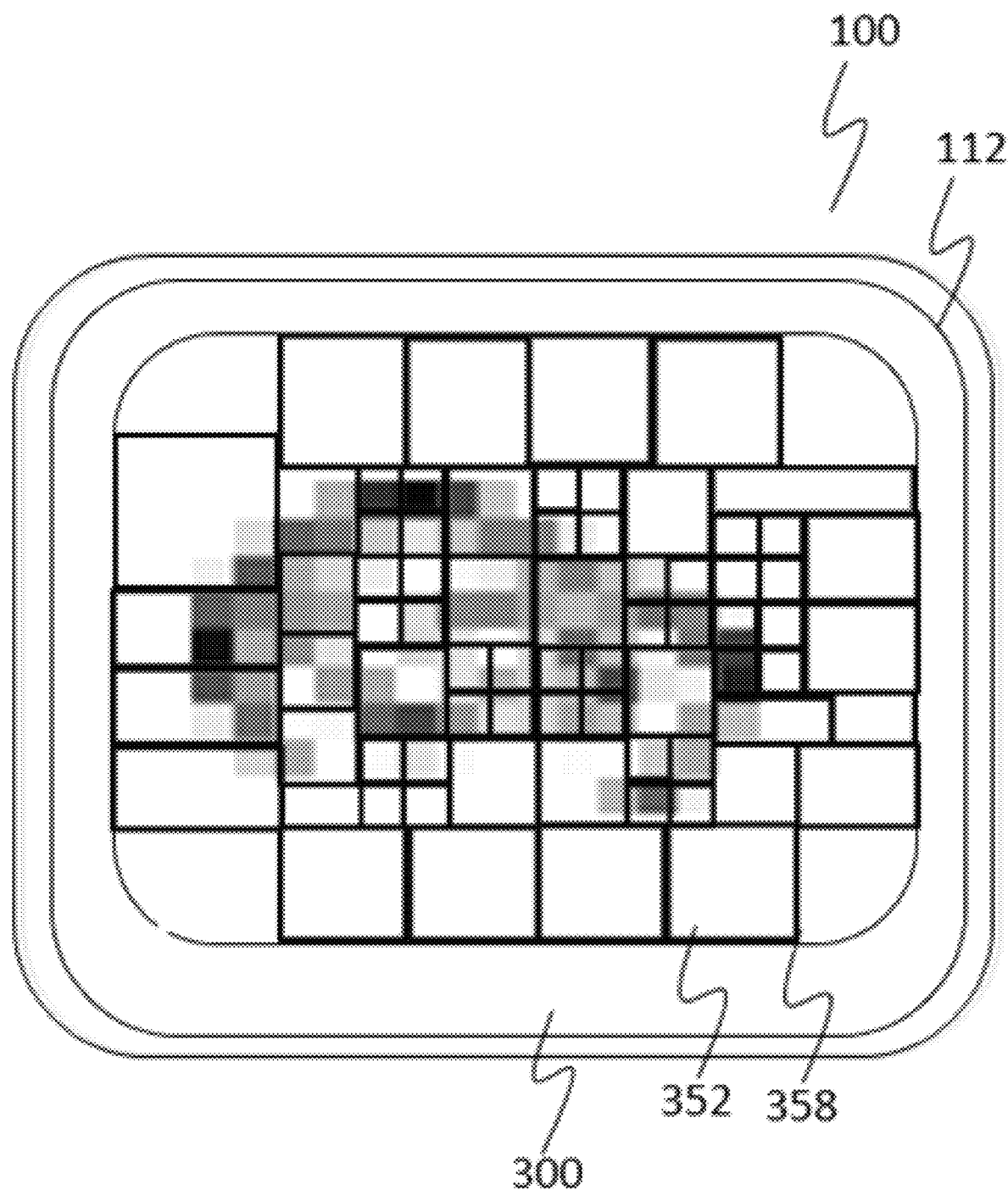
FIG. 10 illustrates an example of another arrangement of bounding areas.
Figure 11:
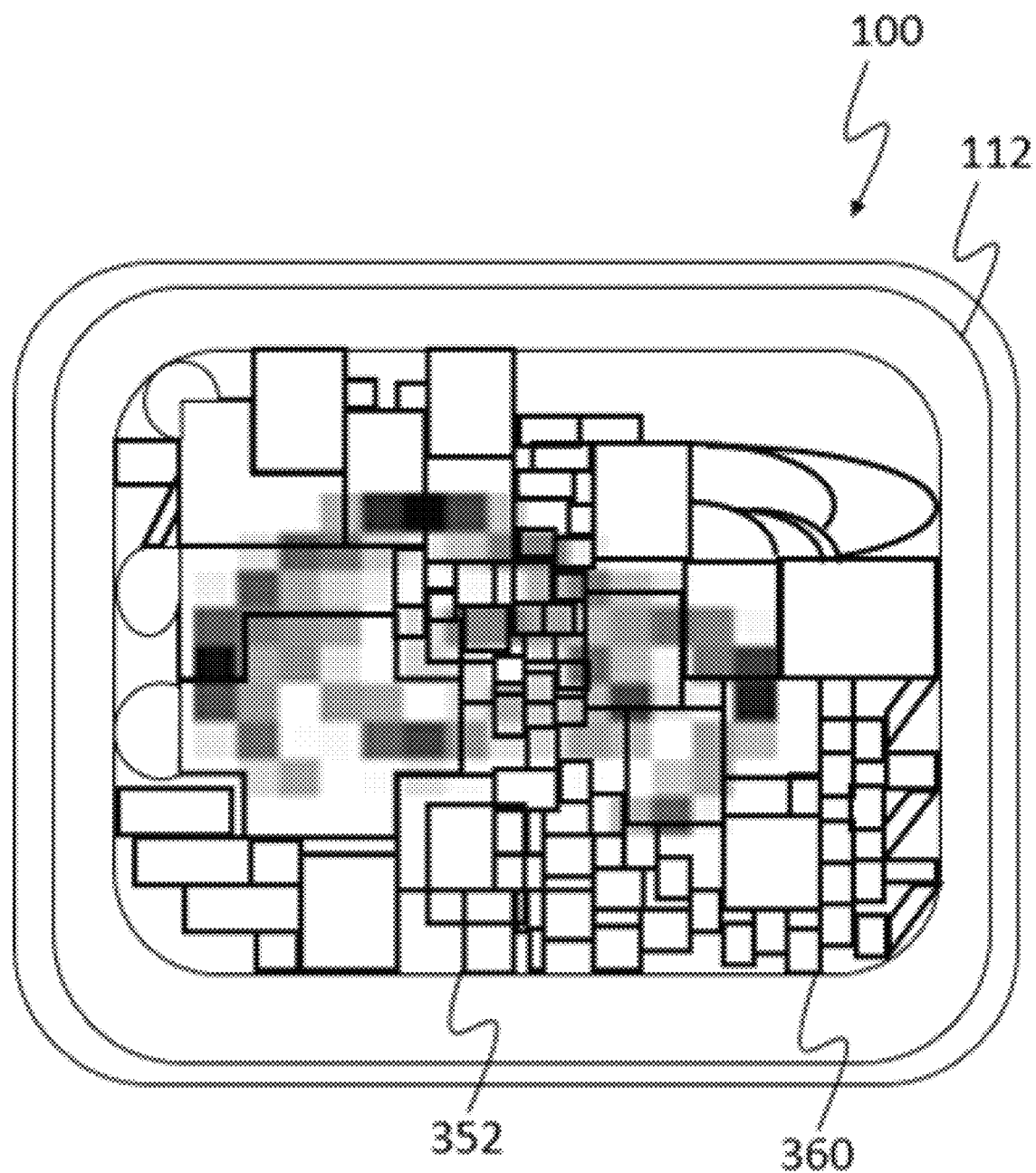
FIG. 11 illustrates an example of another arrangement of bounding areas.
Figure 12:
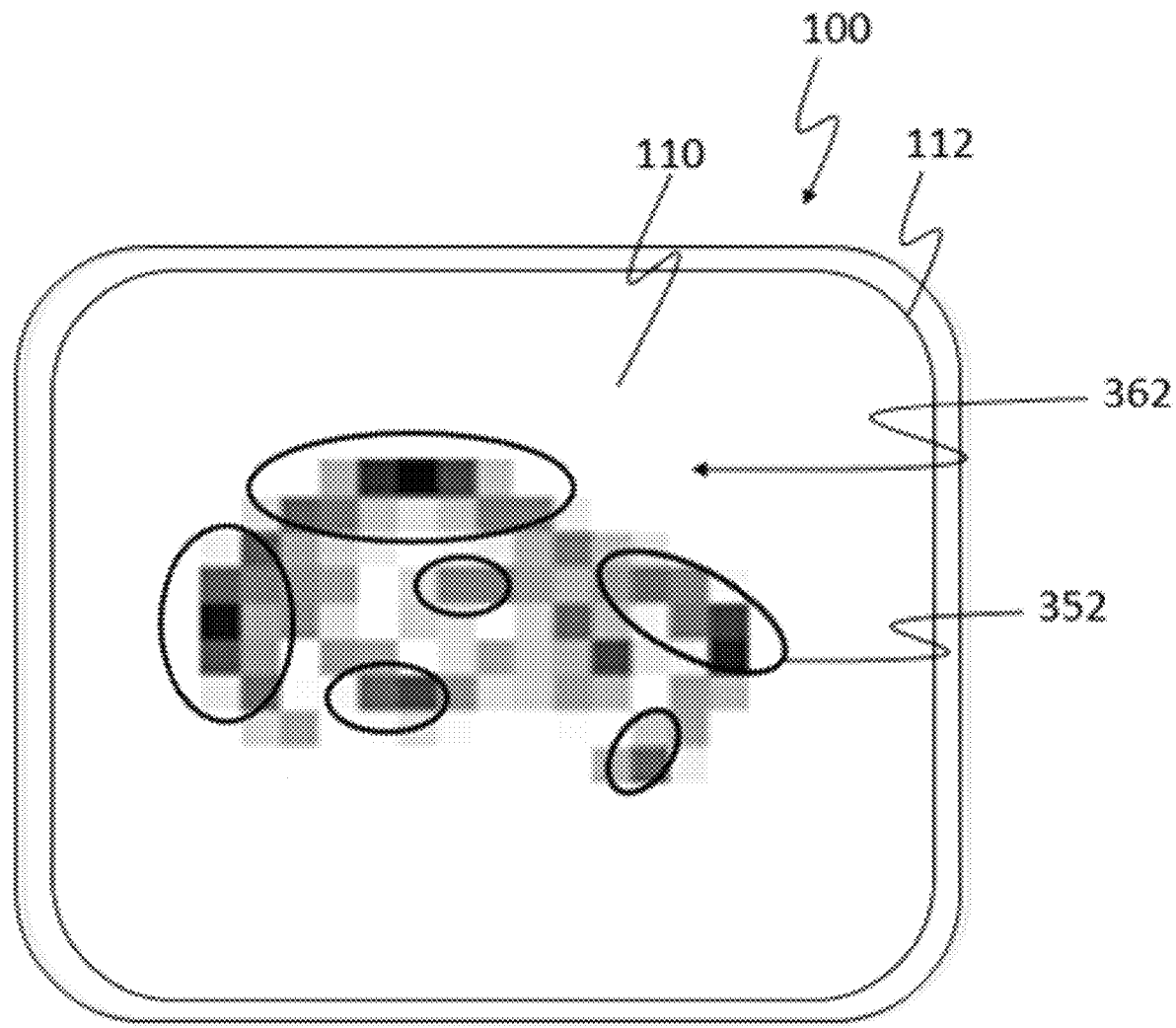
FIG. 12 illustrates an example of still another arrangement of bounding areas.

FIG. 9 illustrates one example of a pattern of bounding areas 300 that can be used in a subdivision analysis. In the example of FIG. 9, a generally uniformly patterned array 350 of bounding areas 352 is used to subdivide frame data 300. However in it will be appreciated that this is not critical. For example in the embodiment shown in FIG. 10, a pattern 358 of bounding areas 352 is used having a variety of differently sized bounding areas 352 and as shown in FIG. 10, a pattern 358 of bounding areas 352 has can have bounding areas 352 with any number of different sizes. Additionally, as is shown in FIG. 11, a pattern 360 of bounding areas 352 can have bounding 352 areas that are shaped in any of a variety of configurations. Finally, as is shown in FIG. 12, bounding areas 352 can take the form of a pattern 362 of bounding areas 352 that are defined based in part on the frame data itself with the pattern delineating different bounding areas around concentrated portions of contact with touch sensitive surface 112. Additionally, derivatives of all the aforementioned boundary arrangements can be used (first and second order).

In some embodiments, a predetermined pattern of bounding areas 352 can be used to analyze all frame data. Alternatively, the pattern of bounding areas 352 can be determined dynamically based upon a mode of operation of touch sensitive device 100.

The frame data within the subdivisions defined by bounding areas 352 is then analyzed to determine a potential contact type for each subdivision (step 410). This can be done for example by determining whether there is a pattern analysis of the frame data that is consistent with the subdivision analysis. This pattern analysis can use conventional pattern identification methods to locate patterns of touch indicative of touch with certain objects such as by identifying patterns within the subdivisions. A classification can then be determined for the object in contact with the touch sensitive surface when a pattern analysis is consistent with the subdivision analysis. Optionally, in one embodiment, the classification can be determined for example, based on touch intensity. Touch intensity can be computed in a variety of manners, for example, touch intensity may be determined as being above or below a threshold, or as one of low, medium, and high intensities. Alternatively, the touch intensities may be determined as a continuous numerical value, for example, between 0.0 and 100.0. In this case, the number of types of the touch intensities is determined according to the number of criteria to distinguish the magnitude of the amplitude intensity of the contact.

Since the touch intensity may change radically depending on object 124 that has applied the touch, it may be advantageous to determine an object 124 type criteria in order to distinguish the magnitude of the amplitude of the digital sound/vibration signal with respect to the individual types of objects 124. Such a determination may be made in any of a variety of ways. For example, such discrimination may be performed at least in part by using vibro-acoustic data such as is described in a commonly assigned and co-pending U.S. patent application Ser. No. 14/612,089, entitled "Method and Apparatus for Classifying Touch Events on a Touch Sensitive Surface," filed on Feb. 2, 2015, and incorporated by reference herein in its entirety. This application in part describes an apparatus for classifying touch events having a touch sensitive surface configured to generate a touch event when an object or finger touches the touch sensitive surface, wherein the touch event entails a mechanical vibration generated upon contact with the surface, a touch detector configured to detect the onset of a touch and a touch event classifier configured to classify the touch event to identify the object used for the touch event.

Additionally, such a determination may also be performed at least in part using the techniques described in commonly assigned and co-pending "Capture of Vibro-Acoustic Data used to Determine Touch Types, U.S. patent application Ser. No. 13/958,427 filed on Aug. 2, 2013 and incorporated herein by reference in its entirety. This application describes in part a method for interaction between a user and an electronic device having a touch sensitive surface. In this method a touch event trigger is received that indicates an occurrence of a physical touch event on the touch-sensitive surface. Touch data produced by the touch event is accessed and vibro-acoustic data for a vibro-acoustic signal produced by the physical touch event is accessed for a time window that begins at a time that is prior to receipt of the touch event trigger and a touch type for the touch event is determined based on the touch data and the vibro-acoustic data.

Similarly, such a determination may be performed at least in part using the techniques described in commonly assigned and co-pending U.S. patent application Ser. No. 14/219,919, entitled "Method and Device for Sensing Touch Inputs", filed on Mar. 19, 2014 and incorporated herein by reference in its entirety. This application describes in part, a method for sensing touch inputs to digital equipment in which a sound/vibration signal that is generated by a touch is sensed and the sensed sound/vibration signal is digitally processed. Here the type of touch means as well as a touch intensity is determined based on features derived from time and frequency domain representations of the processed sound/vibration signal.

In some cases determination of touch intensity may be performed at least in part based upon vibro-acoustic differences between contact made with a sensing surface when different parts of a input tool contact a touch sensitive surface. One example of this can be found in commonly assigned and co-pending U.S. patent application Ser. No. 13/780,494 entitled "Input Tools Having Vibro-Acoustically Distinct Regions and Computing Device For Use With Same", filed on Feb. 28, 2013 and incorporated herein by reference in its entirety. This application describes in part an input tool for interacting with a touch screen, the input tool comprising: a body in the form of a stylus, the body having one or more vibro-acoustically distinct regions, wherein each virbo-acoustically region produces a discrete vibro-acoustic signal when it touches a surface of the touch screen and the virbo-acoustic signal is used to detect what region of the input tool was used. Such vibro-acoustic signals can also be used to discriminate between different types of finger contacts such as contact with the knuckle, fingernail and fingertip as is described in commonly assigned and co-pending U.S. patent application Ser. No. 13/849,698, entitled "Method and System For Activating Different Interactive Functions Using Different Types of Finger Contact", filed on Mar. 25, 2013 and incorporated by reference in its entirety.

Finger touch type determinations may for example result in execution of a first action for a first finger touch type and a second action for a second finger touch type. For example, U.S. patent application Ser. No. 13/887,711 entitled "Using Finger Touch Types to Interact with Electronic Devices", filed on May 6, 2013 and incorporated by reference in its entirety describes such an application.

Touch intensity may also be performed based at least in part on capacitive data. For example in commonly assigned and co-pending U.S. patent application Ser. No. 14/191,329, entitled "Using Capacitive Images for Touch Type Classification", filed on Feb. 26, 2014, describes in part a method of interaction between a user and an electronic device having a touch sensitive surface. In one aspect of this, a capacitive image is accessed comprising capacitive image data corresponding to capacitances at a plurality of locations on the touch-sensitive surface, the capacitances varying in response to a physical touch on the touch-sensitive surface The capacitive image data is processed and a touch type is determined for the physical touch based on the processed capacitive image data. It may also be useful to, where possible to do so, maintain heuristic data regarding such objects.

Touch intensity data can be determined based upon the touch intensity between object 124 and touch sensitive surface 112 which in turn can be determined for example based upon capacitance, resistance or shear force measurements. Additionally, touch intensity data can be determined based upon sensed variations in an amount of force applied against touch sensitive surface 112 which can be sensed in the various ways described in greater detail above and in any other know manners for sensing force applied against a surface.

Object classification unit 230 may transmit object characterization information. Furthermore, object classification unit 230 may transmit touch intensity data characterizing an amount of force or other touch intensity information characterizing the intensity of a touch applied by or through object 124 during contact. This can be done in one embodiment by providing touch intensity data that corresponds to each element of touch intensity data or by sampling, mathematically processing or otherwise processing force to characterize the amount of force or applied during the period in which frame data is obtained.

The analysis of frame data performed in each subdivision can take a variety of forms including:
- Average
- Standard Deviation
- Standard deviation (normalized by overall amplitude)
- Variance
- Skewness Kurtosis Sum
- Absolute sum
- Root Mean Square (RMS)
- Crest Factor
- Dispersion Entropy Power sum
- Centroid (Center of mass)
- Coefficient of variation Zero-crossings
- Template match scores for a set of known exemplar signals using the following methods:
- convolution,
- inverse filter matching technique,
- sum-squared difference (SSD), and,
- elastic matching.

In some embodiments, touch sensing system 110 alone or in combination with other components of touch sensitive device 100 will generate additional data that may be of use including but not limited to:
- location of touch contact (2D, or 3D in the case of curved glass or other non-planar geometry),
- size of touch contact (some touch technologies provide an ellipse of the touch contact with major and minor axes),
- rotation of the touch contact,
- shape of touch (some touch technologies can provide the actual shape of the touch, and not just a circle or ellipse),
- Surface area of the touch contact (e.g., in squared mm or pixels), Pressure of touch (available on some touch systems),
- shear of touch (available on some touch systems) ("Shear stress (also called "tangential force" in the literature) arises from a force vector perpendicular to the surface normal of a touchscreen (i.e., parallel to the touchscreen surface). This is similar to normal stress—what is commonly called pressure—which arises from a force vector parallel to the surface normal."),
- number of touch contacts,
- capacitance of touch (if using a capacitive touch screen),
- swept frequency capacitance of touch (if using a swept frequency capacitive touch screen), and,
- swept frequency impedance of touch (if using a swept frequency capacitive touch screen).

In one embodiment pattern of bounding areas 320 can be defined in the frame data by transforming the bounding areas into a frequency domain representation (e.g., using a Fast Fourier Transform or similar Function). The following features are extracted from the frequency domain representation:
- spectral centroid,
- spectral density,
- spherical harmonics,
- total average spectral energy, and
- log spectral band ratios.

Object classification unit 230 can use any number of approaches, including but not limited to basic heuristics, decision trees, Support Vector Machine, Random Forest, Naive Bayes, elastic matching, dynamic time warping, template matching, k-means clustering, K-nearest neighbors algorithm, neural network, Multilayer perceptron, multinomial logistic regression, gaussian mixture models, and AdaBoost.

Additionally, object classification unit 230 also can combine results from several different classifying approaches through e.g., a voting scheme or through analysis of a pattern from which it can be determined what portions of the touch sensitive surface were in contact with an object during a time period.

Object classification unit 230 based upon the analysis of the pertinent data associated with the frame data determines whether the pattern analysis classification is consistent with the results of the subdivision analysis. Where this is not consistent, a subsequent frame is obtained and analyzed (step 440).

However, where the analysis is consistent, the frame contact is determined 440 consistent with the pattern analysis or other classification and any further analysis such as refined analyses of the frame data that may be performed once that the object in contact with the touch sensitive surface is determined.

Once that a classification has been determined for the object in contact with touch sensitive device 100, an event may be determined based upon the classification. In order to reduce the chance of false positive mode changes (i.e., switching to ear use), two exemplary strategies can be followed. The embodiment of FIG. 8 illustrates the first of these two exemplary strategies.

In this embodiment, event determination system 250 uses frame data from more than one time period to assist in the classification. For example, contact sensitive surface 112 may capture the touch image/frame data at a particular frame rate (e.g., 30 frames per second). The frame data captured during of these frames can be individually classified (e.g., "ear touching" or "no contact"). Although any contact in any given frame data may have lower classification confidence, a more robust result can be achieved by using a small voting window. For example, if the last 10 touch screen frames had the following classification result—"ear, ear, no contact, ear, no contact, ear, ear, ear, ear, no contact"—the result would be an "ear" classification (6 out of the last 10 classification results) (step 450). Similarly, there may be predetermined patterns classification changes over time for a contact that can be identified and used for classification purposes. For example, it may be expected that there will be a rate of "no contact" determinations during an ear contact. For example, if it is expected that three out of ten classifications of contacts during a period where an ear is held against a touch screen will show no contacts or if it is expected that at least one out of five frames will show no contacts then the reliability of an ear contact classification in the above example is enhanced by the presence of the "no contact" determinations. The determination made can be termed a current classification state and the current classification state can be used determine an event such as enabling or disabling display 110 or a portion of a display 110 or taking other measures (step 460).

Alternatively, some classifiers produce a classification confidence. To yield more robust behavior, the mode of the device will only switch upon a high confidence classification. If low confidence classifications are produced, the device will simply maintain its current mode. The process can then terminate or continue (step 470).

Furthermore, to avoid "flickering" (i.e., rapidly switching between modes) between two or more modes, a hysteresis function can be used.

Figure 13:
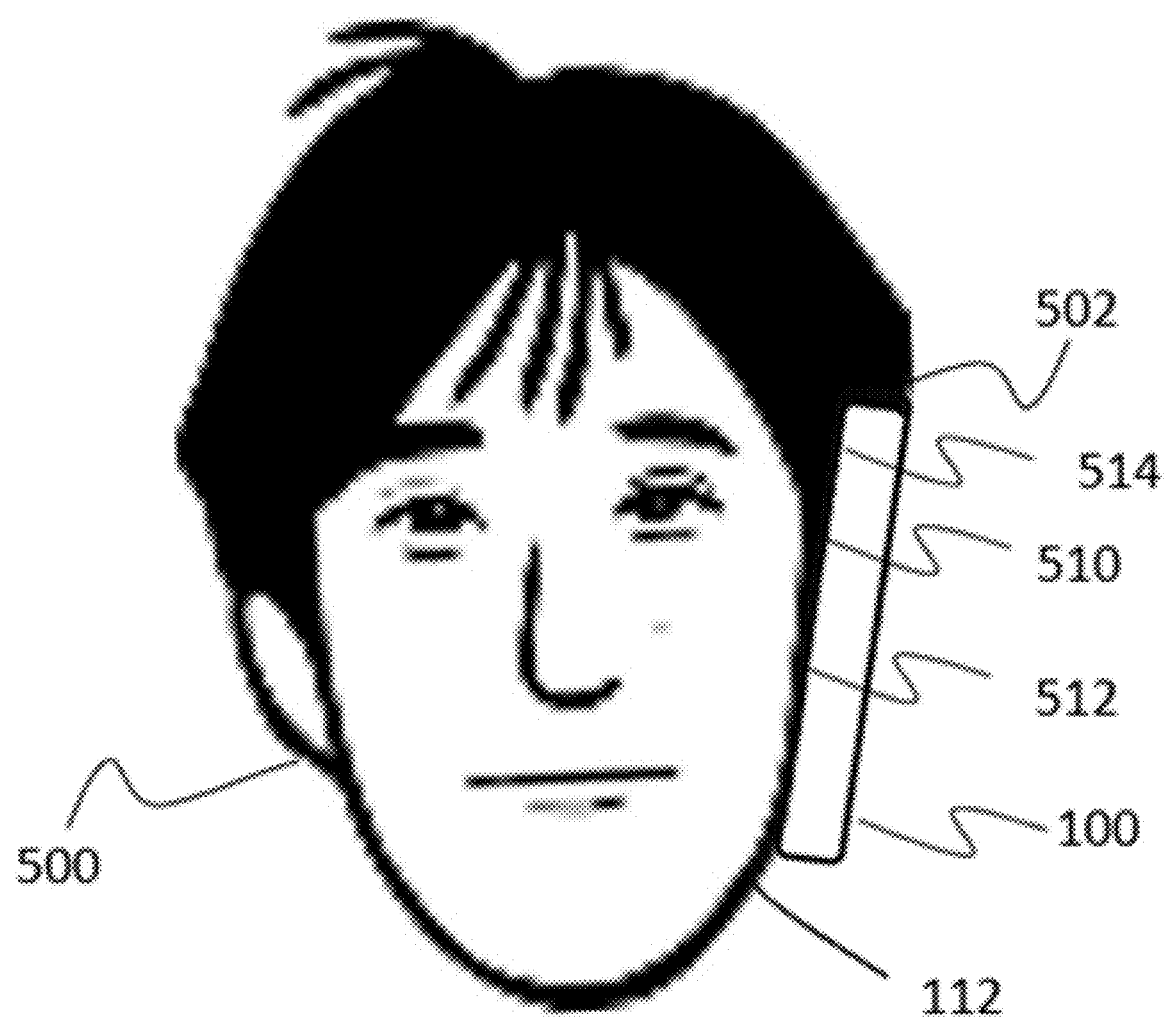
FIG. 13 illustrates a touch sensitive device held against a head of a user.

It will be appreciated that a variety of different contact classifications are possible and that more than one contact classification may be found in the received frame data. Consider for example the scenario illustrated in FIGS. 13 and 14. As is shown in FIG. 13, it is not uncommon for a user 500 to hold a touch sensitive device 100 such as a cellular phone against his head 502 such that contact pattern 508 between touch sensitive surface 112 and the head 502 exists in more than one place. As shown in FIG. 13, there are several different contacts between head 502 and touch sensitive surface including an ear contact 510, a cheek contact 512 and possibly a hair/head contact 514.

Figure 14:
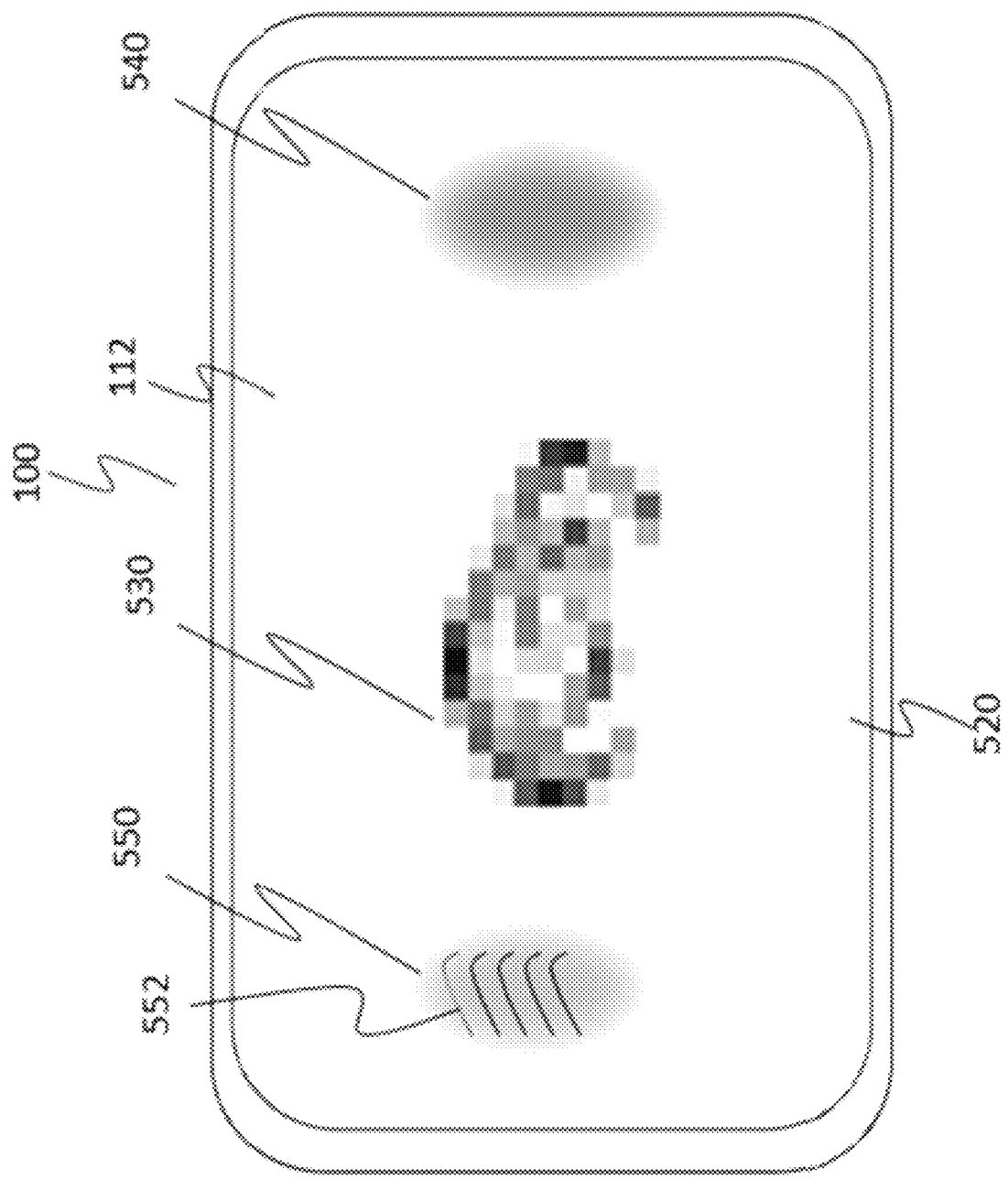
FIG. 14 illustrates an example of an image of frame data that may be sensed when touch sensitive device is held against the head of the user when held as shown in FIG. 13.

FIG. 14 illustrates an example of a frame image 520 of frame data that may be determined during a time period when frame data for a frame is acquired. Here, ear contact 510 yields a contact pattern 530, while cheek contact 512 provides a relatively uniform contact pattern 540 having an ovular shape while hair/head contact yields a contact pattern 550 having some uniformity but potentially influenced by the presence of elongate striations 552 due to contact with hair.

It will be appreciated that each of contact patterns 530, 540 and 550 provides a signature that viewed collectively or individually may be capable of being classified or that may be capable of being used to corroborate a classification.

It will also be appreciated that many different variations of this are possible. For example, a user may wear glasses that wrap around the rear of the ear and therefore supports the ear in ways that may adjust the contact pattern sensed when the phone is held up against an ear. Similarly, the user may wear headgear that may be sensed or piercings/jewelry that create particular contact patterns with touch sensitive surface 100 that may be particularly useful in determining when a head is held against touch sensitive surface 112.

Figure 15:
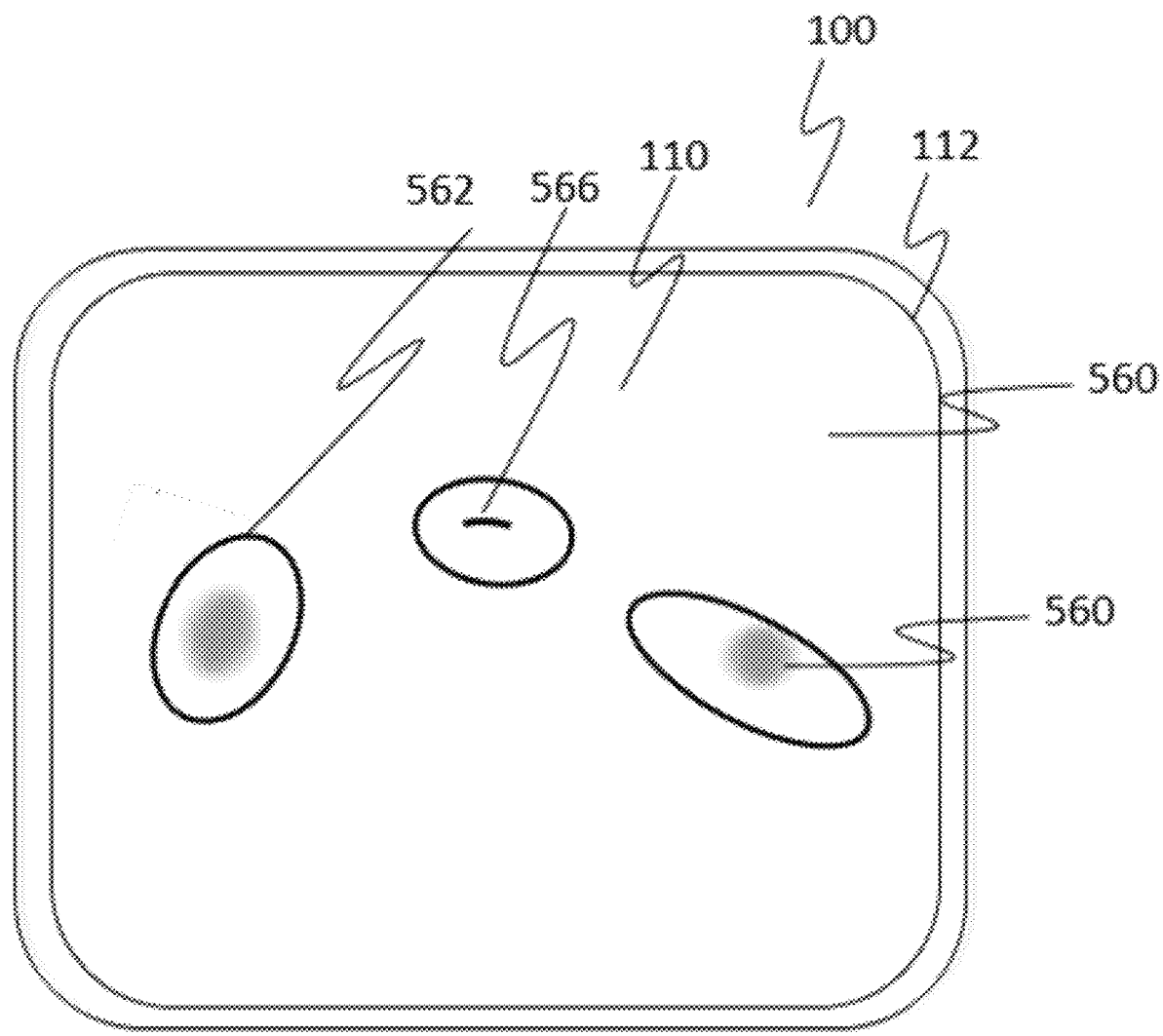
FIG. 15 illustrates another example of an image of frame data that may be sensed when touch sensitive device is in contact with other objects.

FIG. 15 shows another example further illustrating application of the principles described above. FIG. 15 illustrates a frame image 560 representing frame data having multiple contacts 562, 564 and 566. In this example classification of is performed as described above, with frame data being classified by detecting patterns in frame data 560. However, it will be appreciated that, pattern classification of frame data 560 may not yield results that have a high confidence. Accordingly, subdivision analysis (step 410) can be applied. In this case such subdivision analysis can help to make a higher confidence determination for example of whether contacts 562 are knuckle contacts or fingertip contacts based upon the analysis described above. Similarly, a determination can be made as to whether contact 556 is a fingernail contact, stylus contact or other contact with touch sensitive surface 112 based upon the analyses described herein.

It will be appreciated from this that using the techniques described herein, touch sensitive devices can be provided with improved ability to interpret patterns of contact with a touch sensitive surface.

For instance, it will be understood that the ordering of and the number of method steps can be changed within the spirit and scope of the invention.

Figure 16:
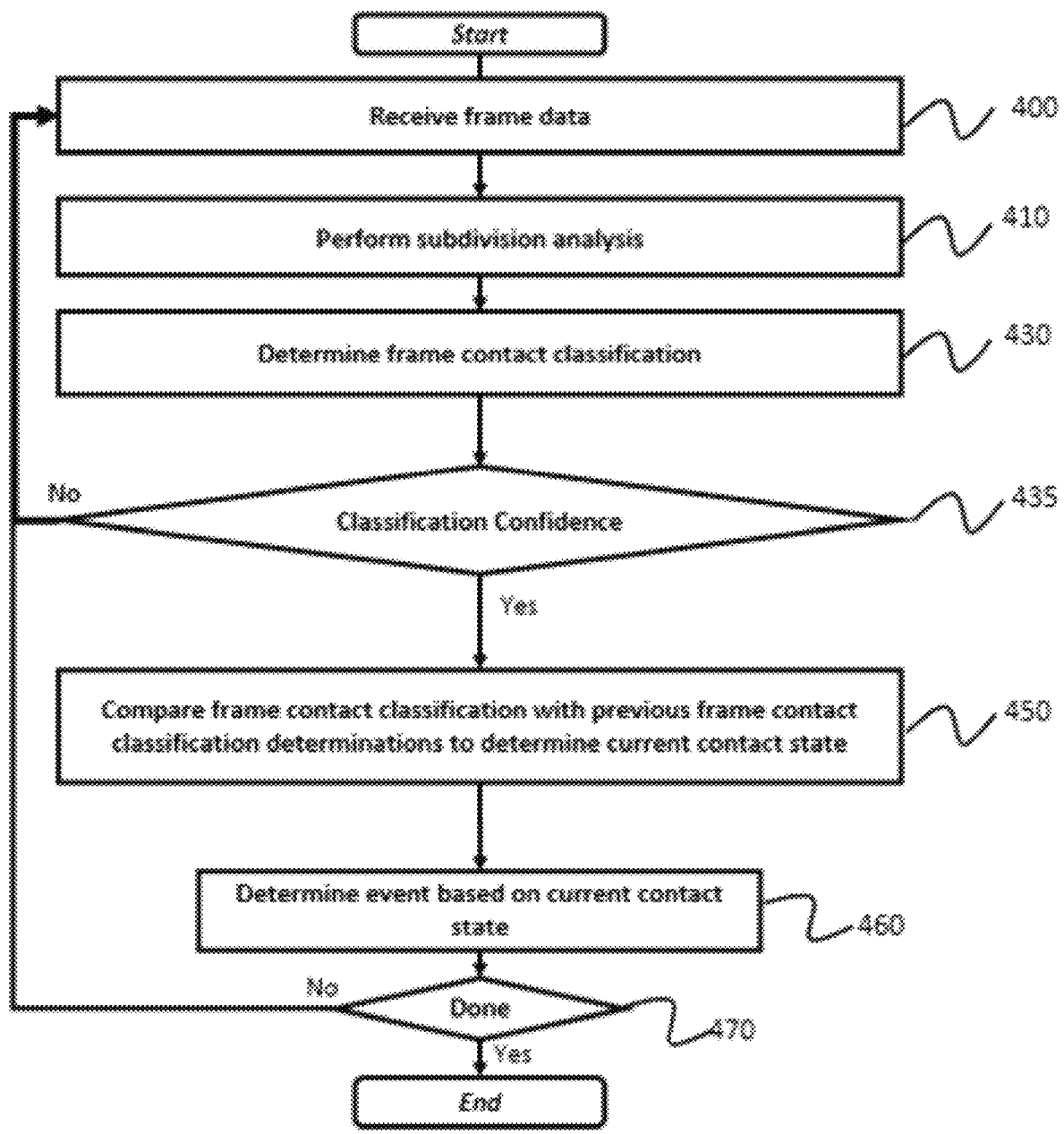
FIG. 16 illustrates another example embodiment of a method for operating a touch sensitive device.

FIG. 16 illustrates an example of this. In the embodiment of FIG. 16, a subdivision analysis (step 410) is executed and frame contact classification determinations (step 430) are then made based upon the subdivision analysis.

As is generally described above, in subdivision analysis (step 410) a number of descriptive features each subdivision can then be computed. These descriptive features can be determined for example by analysis of the data within the subdivision. Examples of the analyses include the analyses described above with respect to subdivision analysis step 4 and can for example include determining a high or low intensities such as a maximum intensity within the subdivision, a size or shape of the areas of intensities within a subdivision, a standard deviation of intensities within the subdivision or any other information that can be determined based upon the frame data within a subdivision. Additionally, characteristics of one or more subdivisions adjacent to or otherwise proximate to a subdivision being analyzed can also be used to compute descriptive features for a subdivision.

In the embodiment of FIG. 16 a classification determination (step 430) can then be made based upon the descriptive features for the subdivisions. For example, subdivision analysis (step 410) might identify descriptive features for a subdivision indicating that a particular subdivision of the frame data appears to represent an ear lobe. Classification determination (step 430) can then determine whether the subdivision is located at proximate to a bottom of one or more subdivisions that form a larger contact area that may appear to be part of a mid-portion of an ear, when an ear in contact with touch sensitive surface 112. In contrast, if the subdivision appears to be an ear lobe but appears in the middle of a contact area, classification determination might decide it is not at ear.

It will be understood from above that in either of the embodiment illustrated in FIG. 8 or in FIG. 16 may make inventive use of any or all of the descriptive features determined for a subdivision of the frame data, the location of the subdivision, and the shape of the subdivision, as well as frame data and descriptive features associated with subdivisions that are adjacent to or proximate to the subdivision being analyzed in order to improve any or all of the reliability, speed or efficiency of the process.

The classification determination can optionally be subject to confidence testing (step 435) to determine whether there is adequate confidence in the classification determination (step 430). As is noted above, some classifiers produce a classification confidence. To yield more robust behavior, the mode of touch sensitive device 100 will only switch when a confidence classification reaches a threshold level which may include a threshold level where the classification confidence is high. Optionally, the confidence of a classification can be evaluated by comparison to alternate classification determinations. Such alternate classifications can be determined in any number of ways and can be made using alternative classification methods, such as classification using pattern analysis as described above or a next best classification determined made using the descriptive features for the subdivisions.

It will be appreciated that where this is done the consistency determining step (step 440) of FIG. 8 or the classification confidence determination (step 435) of FIG. 16 may make inventive use of the combination of features determined during subdivision analysis as well as location information. Furthermore, shape information regarding the shape of any subdivision may be used. Finally, it may also occur that the step of determining a confidence in the classification can be performed by calculating a confidence metric for a classification determination and determining confidence based upon this metric.

In the embodiment of FIG. 16, the processes comparing a frame contact classification with previous frame classifications (step 450) and determining an event based upon a current contact state (step 460) can then be performed generally as described above.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as optical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described above in connection with specific limitations such as detailed components as well as limited embodiments and drawings, these are merely provided to aid general understanding of the invention. The present invention is not limited to the above embodiments, and those skilled in the art will appreciate that various changes and modifications are possible from the above description. [107] Therefore, the spirit of the present invention shall not be limited to the embodiments described above, and the entire scope of the appended claims and their equivalents will fall within the scope and spirit of the invention.

What is claimed is:

1. A method for classifying an object in contact with a touch sensitive surface, the method comprising:
receiving frame data, comprising vibro-acoustic data, representing contact information between the object and the touch sensitive surface, wherein the frame data is divided into a plurality of subdivisions;
analyzing characteristics of the frame data to determine descriptive features for a subdivision of the frame data that are indicative of the object;
performing pattern analysis of the frame data;
determining a frame contact classification for the object in contact with the touch sensitive surface according to a location of the subdivision, intensity data associated with the frame data, and a comparison between the descriptive features for the subdivision and the pattern analysis of the frame data; and
enabling the touch sensitive surface if the frame contact classification identifies a first type of object in contact with the touch sensitive surface and disabling the touch sensitive surface if the frame contact classification identifies a second type of object in contact with the touch sensitive surface.

2. The method of claim 1, further comprising comparing the frame contact classification for the object with previous frame contact classifications to determine a current contact state.

3. The method of claim 1, wherein the frame data is converted into a frequency domain representation and wherein the subdivisions are defined in the frequency domain representation.

4. The method of claim 3, wherein said analyzing characteristics of the frame data to determine descriptive features comprises extracting at least one of a spectral centroid, spectral density, spherical harmonics, total average spectral energy, and log spectral band ratios using the frequency domain representation and using the extractions to classify any contact within each subdivision.

5. The method of claim 1, further comprising determining a current contact state for the object based upon frame contact classifications determined for the object in previously received frame data obtained previously, wherein the operations of enabling and disabling are further based on the current contact state.

6. The method of claim 1, further comprising comparing the frame contact classification for the object with frame contact classifications determined for the object in previously receive frame data and changing a current classification only when a majority of the compared frame contact classifications differs from the frame contact classification.

7. The method of claim 1, further comprising determining a classification confidence based upon the descriptive features for at least one subdivision and switching a mode of touch sensitive device from an existing mode only when the classification confidence reaches a threshold level.

8. The method of claim 1, wherein the performing the pattern analysis comprises performing a pattern classification for the frame data to determine a pattern classification, and wherein a frame contact classification determined according to the descriptive features is not used to determine an event when the frame contact classification is not consistent with the pattern analysis.

9. A touch sensitive device comprising:
a touch sensitive surface having an array of sensors that can sense contact with an object; and
a processor coupled with the touch sensitive surface and configured to:
receive frame data, comprising vibro-acoustic data, representing contact information of the object with the touch sensitive surface and divide into a plurality of subdivisions,
analyze characteristics of the frame data to determine descriptive features for a subdivision of the frame data that are indicative of the object,
perform pattern analysis of the frame data,
determine a frame contact classification for the object in contact with the touch sensitive surface according to a location of the subdivision, intensity data associated with the frame data, and a comparison between the descriptive features for the subdivision and the pattern analysis of the frame data; and
enable the touch sensitive surface if the frame contact classification identifies a first type of object in contact with the touch sensitive surface and disable the touch sensitive surface if the frame contact classification identifies a second type of object in contact with the touch sensitive surface.

10. The touch sensitive device of claim 9, wherein the processor is further configured to compare the frame contact classification for the object with previous frame contact classifications to determine a current contact state.

11. The touch sensitive device of claim 9, wherein the frame data is converted into a frequency domain representation and wherein the subdivisions are defined in the frequency domain representation.

12. The touch sensitive device of claim 11, wherein said analyzing characteristics of the frame data to determine descriptive features comprises extracting at least one of a spectral centroid, spectral density, spherical harmonics, total average spectral energy, and log spectral band ratios using the frequency domain representation and using the extractions to classify any contact within each subdivision.

13. The touch sensitive device of claim 9, wherein the processor is further configured to determine a current contact state for the object based upon frame contact classifications determined for the object in previously received frame data obtained previously, wherein enabling and disabling the touch sensitive surface are each further based on the current contact state.

14. The touch sensitive device of claim 9, wherein the processor is further configured to compare the frame contact classification for the object with frame contact classifications determined for the object in previously receive frame data and change a current classification only when a majority of the compared frame contact classifications differs from the frame contact classification.

15. The touch sensitive device of claim 9, wherein the processor is further configured to determine a classification confidence based upon the descriptive features for at least one subdivision and switch a mode of touch sensitive device from an existing mode only when the classification confidence reaches a threshold level.

16. The touch sensitive device of claim 9, wherein the processor is further configured to perform a pattern classification for the frame data to determine a pattern classification, and wherein a frame contact classification determined according to the descriptive features is not used to determine an event when the frame contact classification is not consistent with the pattern classification.

17. A non-transitory computer-readable recording medium having program instructions that can be executed by various computer components to perform a method comprising:
  receiving frame data, comprising vibro-acoustic data, representing contact information between an object and a touch sensitive surface, wherein the frame data is divided into a plurality of subdivisions;
  analyzing characteristics of the frame data to determine descriptive features for a subdivision of the frame data that are indicative of the object;
  performing pattern analysis of the frame data;
  determining a frame contact classification for the object in contact with the touch sensitive surface according to a location of the subdivision, intensity data associated with the frame data, and a comparison between the descriptive features for the subdivision and the pattern analysis of the frame data; and
  enabling the touch sensitive surface if the frame contact classification identifies a first type of object in contact with the touch sensitive surface and disabling the touch sensitive surface if the frame contact classification identifies a second type of object in contact with the touch sensitive surface.

18. The computer-readable recording medium of claim 17, the method further comprising comparing the frame contact classification for the object with previous frame contact classifications to determine a current contact state.

19. The computer-readable recording medium of claim 17, wherein the frame data is converted into a frequency domain representation and wherein the subdivisions are defined in the frequency domain representation.

20. The computer-readable recording medium of claim 19, wherein said analyzing characteristics of the frame data to determine descriptive features comprises extracting at least one of a spectral centroid, spectral density, spherical harmonics, total average spectral energy, and log spectral band ratios using the frequency domain representation and using the extractions to classify any contact within each subdivision.

21. The computer-readable recording medium of claim 17, the method further comprising determining a current contact state for the object based upon frame contact classifications determined for the object in previously received frame data obtained previously, wherein the operations of enabling and disabling are further based on the current contact state.

22. The computer-readable recording medium of claim 17, the method further comprising comparing the frame contact classification for the object with frame contact classifications determined for the object in previously receive frame data and changing a current classification only when a majority of the compared frame contact classifications differs from the frame contact classification.

23. The computer-readable recording medium of claim 17, the method further comprising determining a classification confidence based upon the descriptive features for at least one subdivision and switching a mode of touch sensitive device from an existing mode only when the classification confidence reaches a threshold level.

24. The computer-readable recording medium of claim 17, wherein the performing the pattern analysis comprises performing a pattern classification for the frame data to determine a pattern classification, and wherein a frame contact classification determined according to the descriptive features is not used to determine an event when the frame contact classification is not consistent with the pattern classification.

* * * * *